United States Patent [19]
Inoue et al.

[11] Patent Number: 5,835,662
[45] Date of Patent: Nov. 10, 1998

[54] EDITING SYSTEM FOR PREDICTIVELY ENCODED VIDEO SIGNALS

[75] Inventors: Kiyoshi Inoue, Kanagawa; Christopher Grey, Tokyo, both of Japan

[73] Assignee: Sony Corporation, Tokyo, Japan

[21] Appl. No.: 698,084

[22] Filed: Aug. 15, 1996

[30] Foreign Application Priority Data

Aug. 18, 1995 [JP] Japan .................................... 7-210749

[51] Int. Cl.⁶ .................................................. H04N 5/93
[52] U.S. Cl. .......................................... 386/52; 386/55
[58] Field of Search ................................. 386/52, 4, 46, 386/83, 92, 55, 65, 109, 111, 33; 360/13; 369/83; H04N 5/93

[56] References Cited

U.S. PATENT DOCUMENTS 5,621,536  4/1997  Kizu ........................................... 386/52
5,732,183  3/1998  Sugiyama .................................... 386/4

FOREIGN PATENT DOCUMENTS

| 0 456 433 A | 11/1991 | European Pat. Off. . |
| 0 561 454 A | 9/1993 | European Pat. Off. . |
| 0 614 186 A | 9/1994 | European Pat. Off. . |
| 0 656 729 A | 6/1995 | European Pat. Off. . |

*Primary Examiner*—Robert Chevalier
*Attorney, Agent, or Firm*—Frommer Lawrence & Haug LLP; William S. Frommer

[57] ABSTRACT

Method and apparatus for editing a plurality of coded communication signals stored on a recording medium by designating for editing a first set of signals, designating from among the remaining signals a second set of signals that include additional information needed to decode the first set of signals, and reproducing from the recording medium the first set of signals and the second set of signals to facilitate proper decoding and editing of the first set of signals.

26 Claims, 16 Drawing Sheets

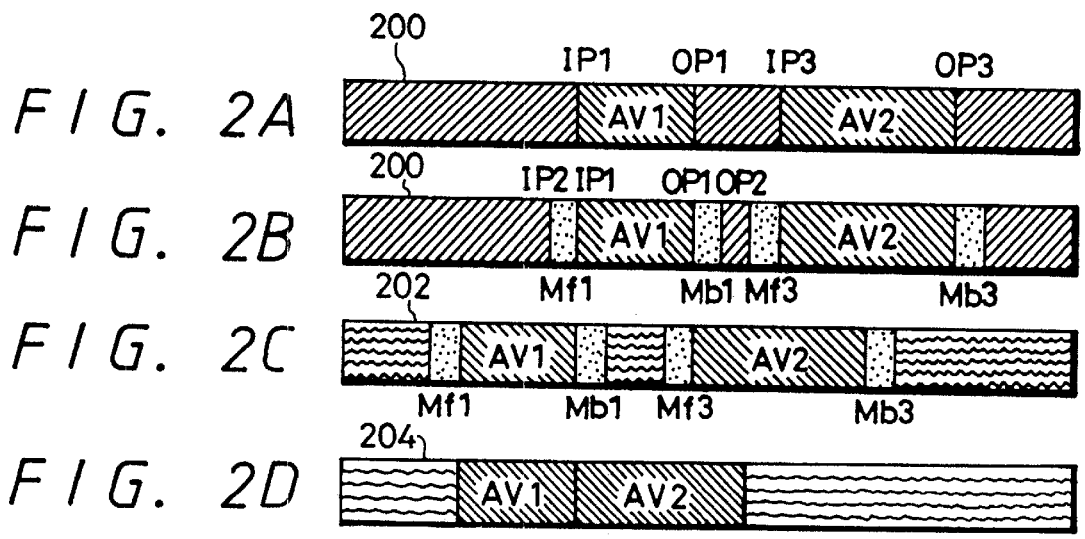
FIG. 2A
FIG. 2B
FIG. 2C
FIG. 2D
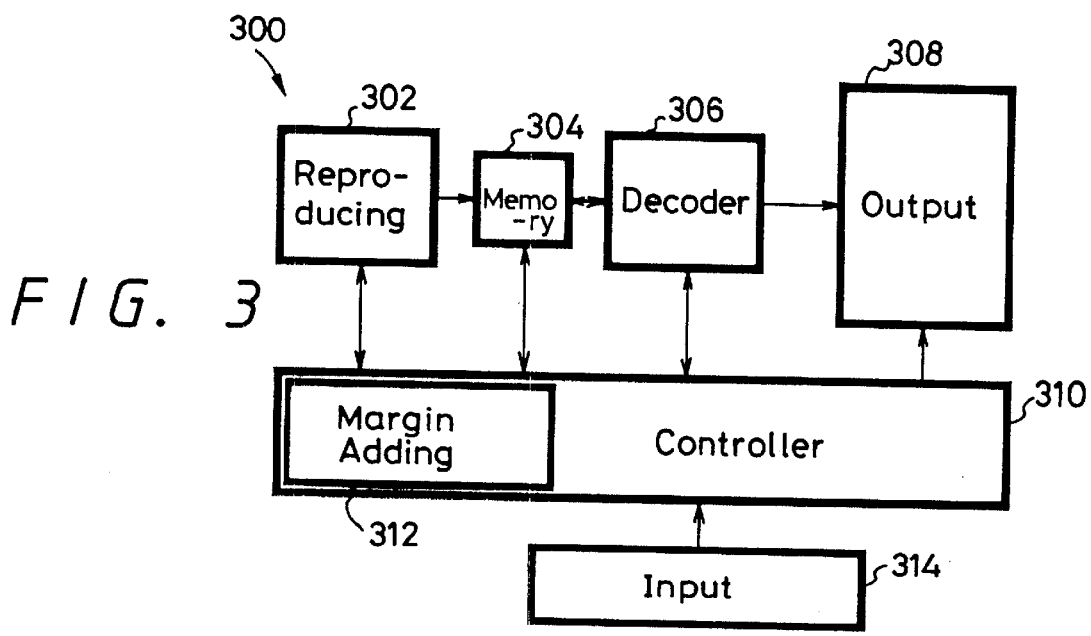
FIG. 3

FIG. 5

| Device ID | Segment ID | Cue-in Time Code | | Start Point Time Code | Cue-in Address | Length | Cue-out Time Code | | Flag |
|---|---|---|---|---|---|---|---|---|---|
| | | First | Second | | | | First | Second | |
| # | # | TCin1 | TCin2 | TCf | ADin | LENGTH | TCout1 | TCout2 | FLG |

500

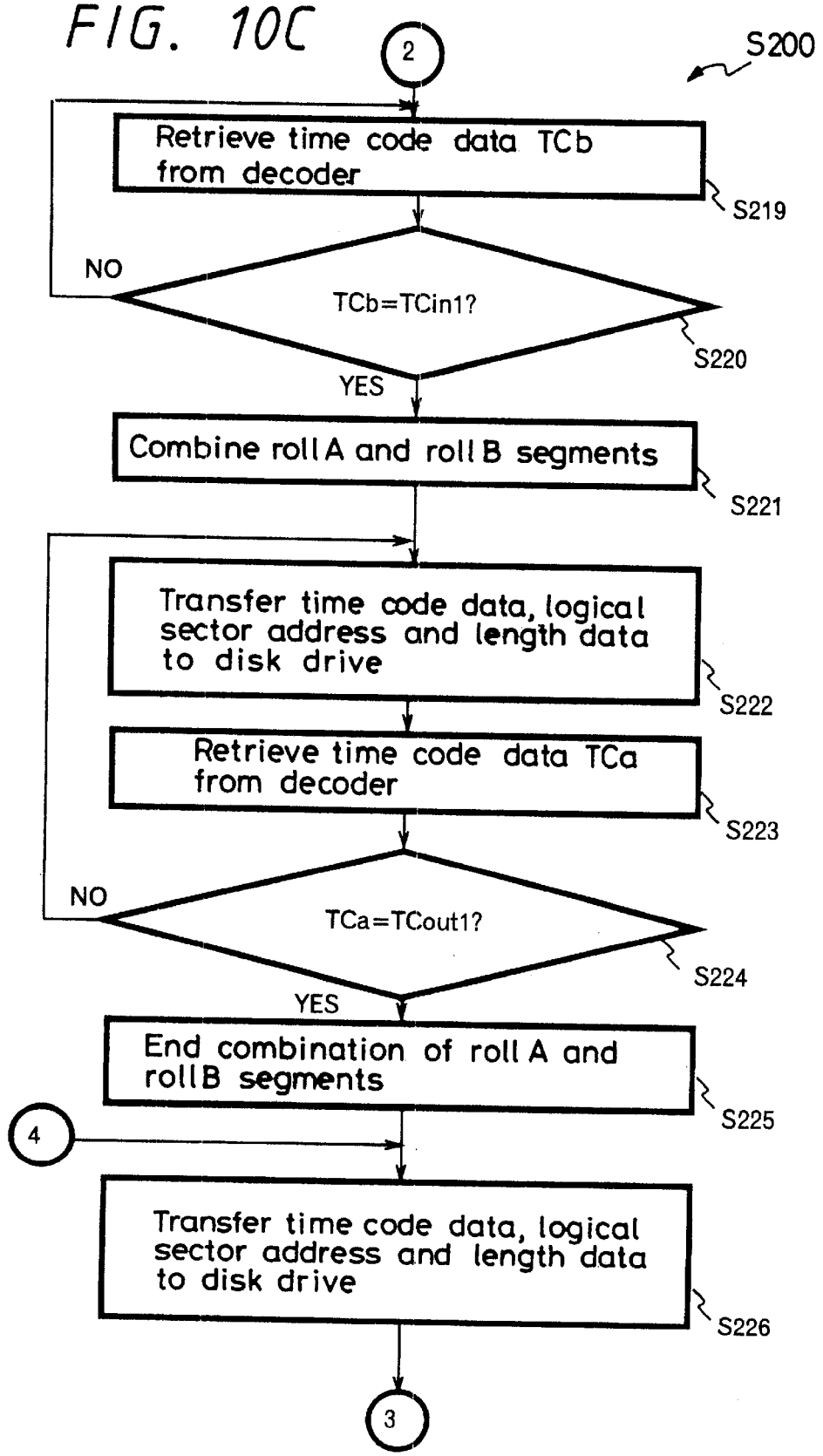

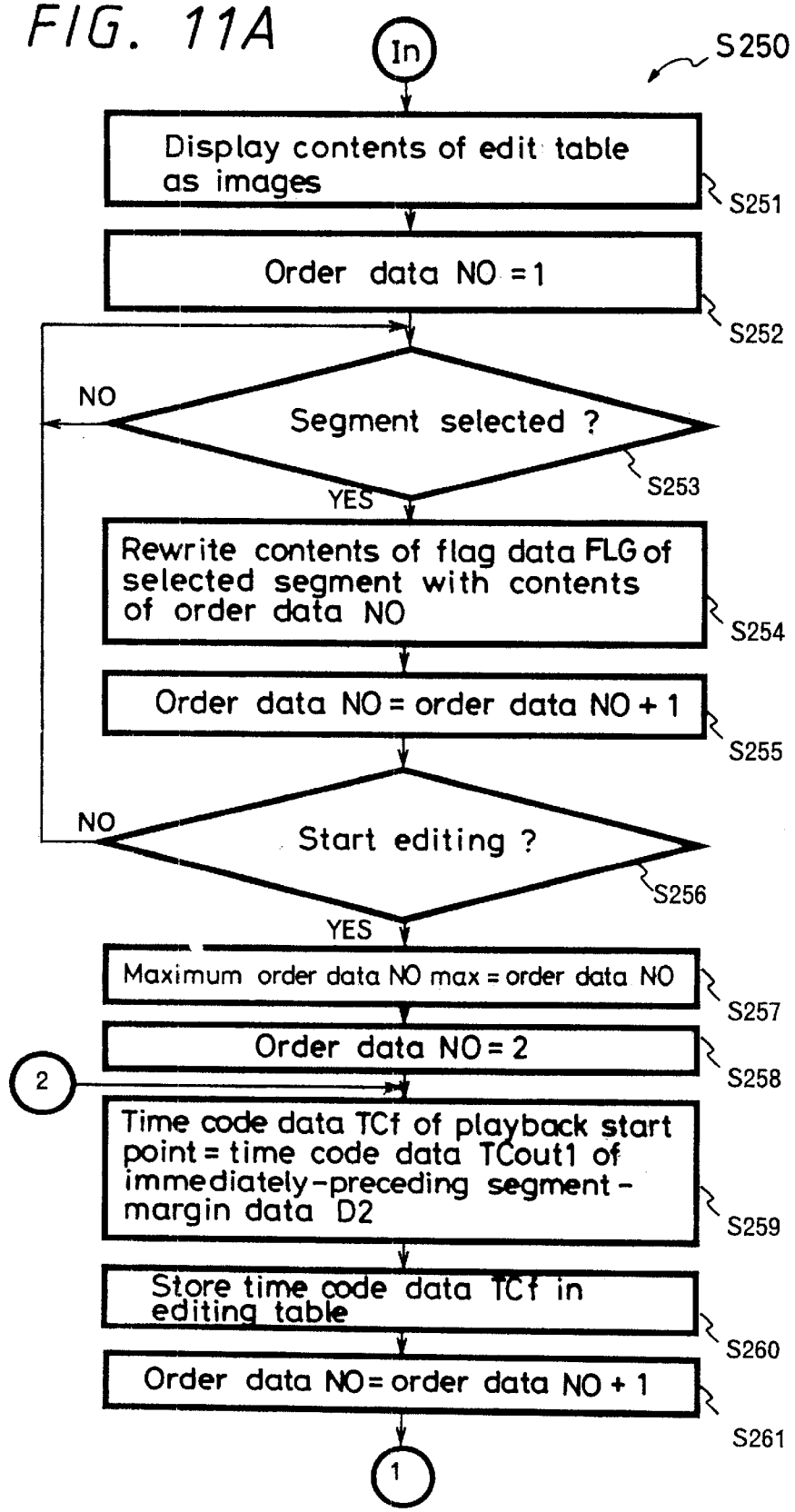

F I G. 11B
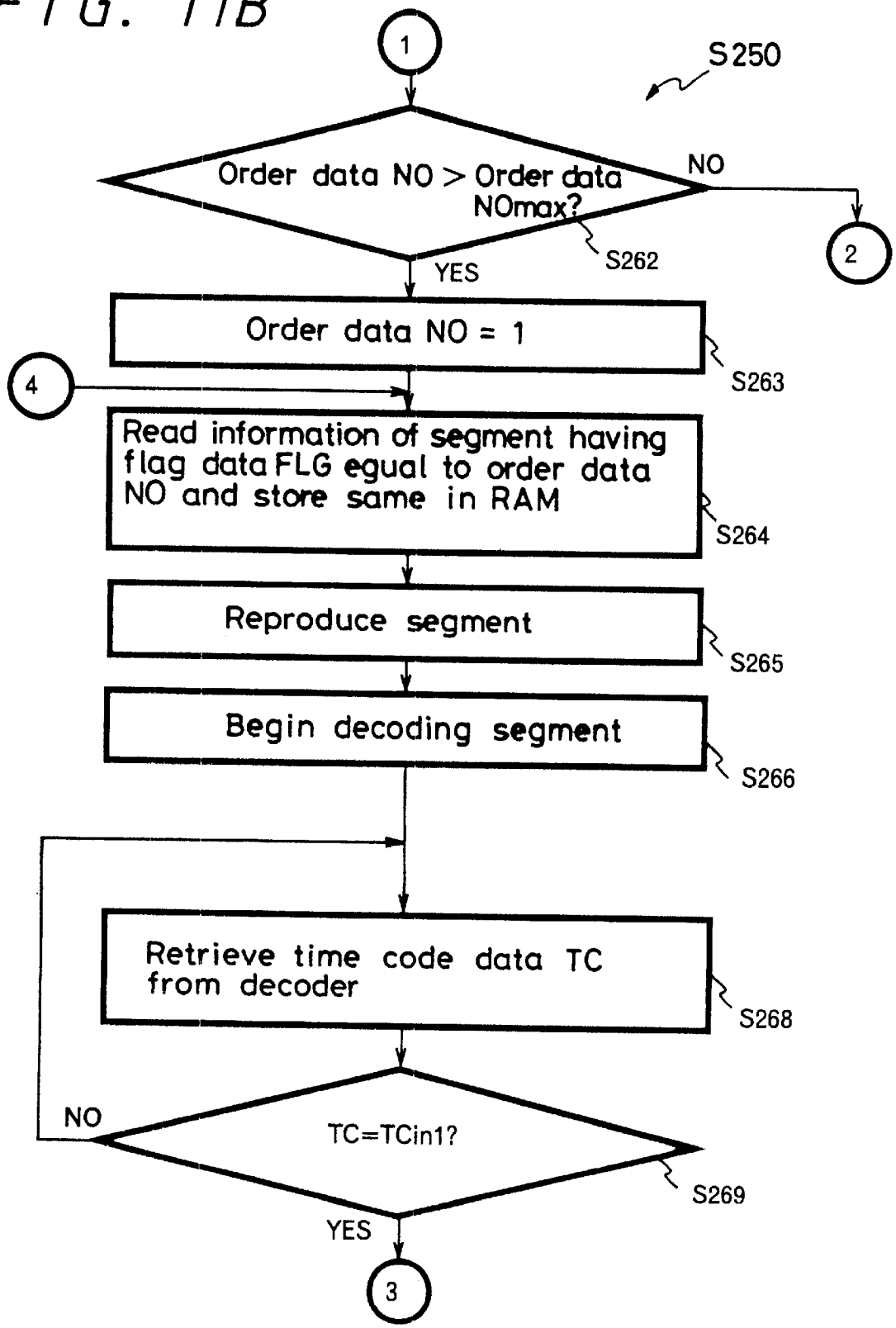

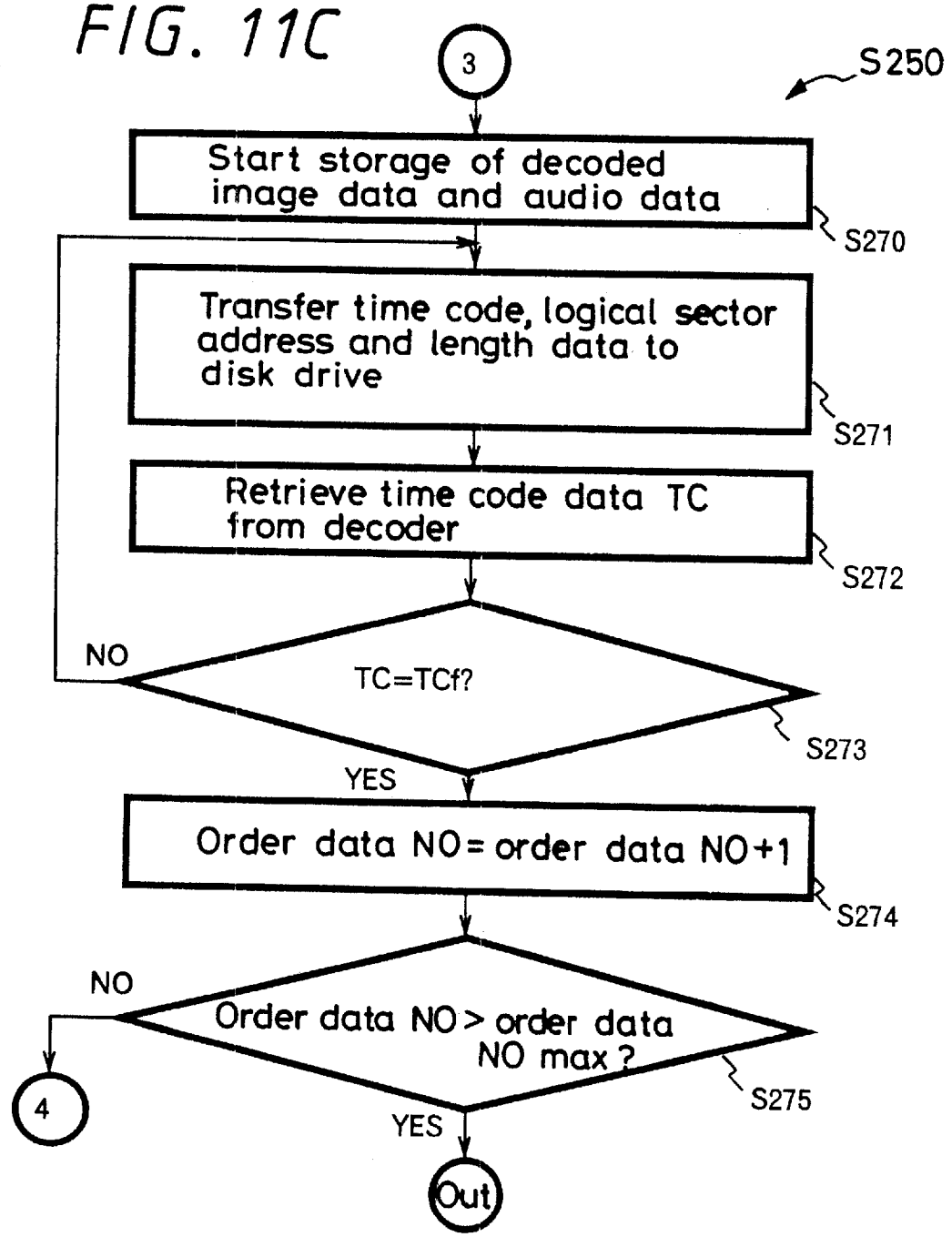

EDITING SYSTEM FOR PREDICTIVELY ENCODED VIDEO SIGNALS

BACKGROUND OF THE INVENTION

This invention relates to an editing system for editing compressed and encoded video signals. More specifically, this invention relates to an editing system for combining multiple segments of predictively encoded video signals.

FIG. 1A shows a prior art editing system for editing uncompressed and uncoded video signals stored on a magnetic tape. The prior art editing system includes a reproducing video tape recorder (reproducing VTR) 100, a recording video tape recorder (recording VTR) 102, and an editor 104. Reproducing VTR 100 reproduces a particular segment of video signals from a magnetic tape (not shown). The boundaries of the segment are referred to as the "cue-in" point and the "cue-out" point. Recording VTR 102 is coupled to an output of reproducing VTR 100 and records the segment of video signals supplied therefrom on a second magnetic tape (also not shown). Editor 104 is coupled to both VTR 100 and VTR 102 and controls the reproduction operation of VTR 100 and the recording operation of VTR 102. Editor 104 coordinates the operation of both VTRs and controls the speed of each magnetic tape.

FIG. 1B illustrates an initial state of the magnetic tape upon which recording VTR 102 records video signals. Similarly, FIG. 1C illustrates an initial state of the magnetic tape from which reproducing VTR 104 reproduces video signals.

In operation, a user enters a playback command into editor 104 to control reproducing VTR 100 to reproduce video signals from the magnetic tape. The reproduced signals are displayed to the user on a monitor (not shown). When a desired segment of video signals is reproduced, the user enters a marking command into editor 104 to mark the desired segment of video signals. In response, editor 104 stores time code data corresponding to the cue-in point (IPp) and the cue-out point (OPp) designating the boundaries of the desired segment as illustrated in FIG. 1C. Optionally, IPp and OPp may be stored on the magnetic tape from which the signals are reproduced or on the magnetic tape upon which reproduced signals are to be recorded.

Upon entry of an edit command by the user, editor 104 controls VTR 100 and VTR 102 to advance the position of each respective magnetic tape to a point just before the cue-in point IPp and to commence reproduction. Editor 104 coordinates the tape speeds of VTRs 100 and 102 as a function of time code data supplied by each VTR regarding its respective reproduction operation. When the time code data from reproducing VTR 100 coincides with cue-in point IPp, editor 104 controls recording VTR 102 to record video signals supplied by VTR 100. FIG. 1D illustrates an edited magnetic tape, produced by recording VTR 102, which includes a segment of video signals supplied by reproducing VTR 100.

Although the prior art editing system of FIG. 1A satisfactorily accomplishes an editing operation for uncompressed and uncoded video signals, it is not suited for the editing of compressed and encoded video signals, such as those compressed and encoded according to an MPEG (Moving Pictures Experts Group) standard. FIG. 1E illustrates an example of frames of video signals compressed and encoded according to an MPEG standard. In this example, two different types of frames of video signals are produced by the compression and encoding operation, hereinafter referred to simply as "encoding". An intraframe encoded frames (I frame), such as one of I1, I3, I5, I7, I9, and I11, is produced by intraframe encoding the video signals of a single picture. Intraframe encoding may include variable-length encoding utilizing the discrete cosine transform (DCT), quantization, run length encoding, Huffman coding, or the like.

A bidirectionally encoded frame (B frame), such as one of B2, B4, B6, B8, B10, and B12, is produced by calculating the differences between the video signals of the picture to be encoded and the video signals of a preceding picture, a subsequent picture, or both a preceding and a subsequent picture, and then by encoding the differences. Such encoding may include the variable-length encoding described previously. As described, a B frame may be produced by forward predictive encoding, backward predictive encoding, bidirectional predictive encoding, or the like. The calculation of differences may include block-by-block comparisons, motion compensation, averaging of data of preceding and subsequent pictures, motion vector calculation, and the like.

As shown in FIG. 1E, each B frame depends upon the data of a previous and/or subsequent frame of video signals. To simplify explanation of the present invention, B frames are shown depending only upon I frames. For example, frame B4 is encoded relative to an averaging of frames I3 and I5. As another example, frame B8 is encoded relative to an averaging of frames I7 and I9. It is understood in the art that B frames may as well depend upon other B frames. A set of B frames, along with the frames from which the B frames depend, may be roughly categorized as a group of pictures (GOP).

To decode a bidirectionally encoded frame, the data of each of the frames upon which the B frame depends is needed. For example, the data of frames I3 and I5 are needed in the decoding operation for frame B4. It is this reliance of B frames upon the data of other frames that precludes the above-described prior art editing system from properly editing data encoded according to an MPEG standard.

Where video signals are encoded according to an MPEG standard, the above-described prior art system will often fail to record on the edited tape all of the data needed to decode reproduced B frames. For example, where a user defines in the reproduced video signals a cue-in point IP at frame B4 and a cue-out point OP at frame B8, the prior art editing system will copy only frames B4, I5, B6, I7, and B8 to the edited tape. The edited tape will not be properly reproducible because frames B4 and B8 rely upon frames I3 and I9, respectively. Without the data of frames I3 and I9 the edited tape cannot be decoded properly. Thus, the prior art editing system will produce an edited tape which lacks data needed for decoding frames of video signals located at the boundaries of the desired segment.

OBJECTS AND SUMMARY OF THE INVENTION

An object of the present invention is to provide an editing system for editing predictively encoded video signals which does not suffer the drawbacks of the prior art.

Another object of the present invention is to provide an editing system for editing frames of video signals encoded according to an MPEG standard to produce an edited signal that can be reproduced without error.

A further object of the present invention is to provide an editing system for editing user-defined segments of video signals by reproducing and processing additional information located outside the user-defined segments.

In accordance with an aspect of the present invention, a method of editing a plurality of coded communication signals stored on a recording medium is provided. The method includes the steps of: designating for a decoding process and for an editing process a plurality of designated signals from among the plurality of coded communication signals, wherein the decoding process requires an additional information not included in the plurality of designated signals; designating from among the plurality of coded communication signals a plurality of additional signals that includes the additional information, wherein the plurality of additional signals is not edited during the editing process; reproducing from the recording medium the plurality of designated signals and the plurality of additional signals; decoding the plurality of additional signals to produce a plurality of decoded additional signals; decoding the plurality of designated signals according to the decoding process with reference to the plurality of decoded additional signals to produce a plurality of decoded signals; and editing the plurality of decoded signals according to the editing process.

In accordance with another aspect of the present invention, an apparatus for editing a plurality of coded communication signals stored on a recording medium is provided. The apparatus includes a first designating device for designating for a decoding process and for an editing process a plurality of designated signals from among the plurality of coded communication signals, wherein the decoding process requires an additional information not included in the plurality of designated signals. The apparatus also includes a second designating device for designating from among the plurality of coded communication signals a plurality of additional signals that includes the additional information, wherein the plurality of additional signals is not edited during the editing process. The apparatus includes a device for reproducing from the recording medium the plurality of designated signals and the plurality of additional signals and includes a first decoding device for decoding the plurality of additional signals to produce a plurality of decoded additional signals. A second decoding device is also included for decoding the plurality of designated signals according to the decoding process with reference to the plurality of decoded additional signals to produce a plurality of decoded signals. Further, the apparatus includes an editing device for editing the plurality of decoded signals according to the editing process.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIGS. 2A, 2B, 2C, and 2D are diagrams of a magnetic tape;

FIG. 3 is a block diagram of an editing system according to an embodiment of the present invention;

FIG. 5 is a format diagram for an editing table;

FIGS. 10A, 10B, 10C, and 10D are flow charts to which reference will be made in describing an operation of the editing system of FIG. 4; and FIGS. 11A, 11B, and 11C are flow charts to which reference will be made in describing an operation of the editing system of FIG. 4.

DETAILED DESCRIPTION OF THE PREFERRED EMBODIMENTS

Figure 1A:
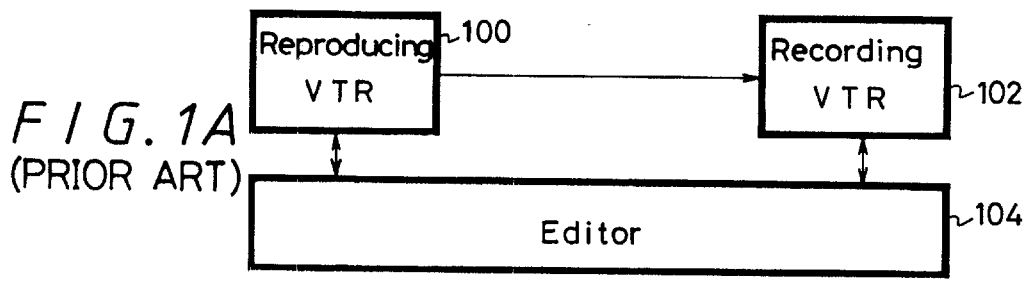
FIG. 1A is a block diagram of a prior art editing system.
Figure 1B:
FIGS. 1B, 1C, and 1D are diagrams of a magnetic tape.
Figure 1C:
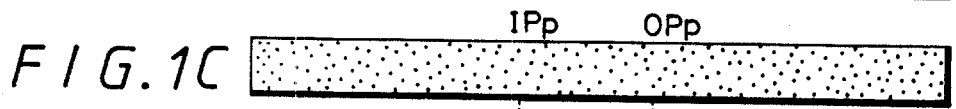
Figure 1D:
Figure 1E:
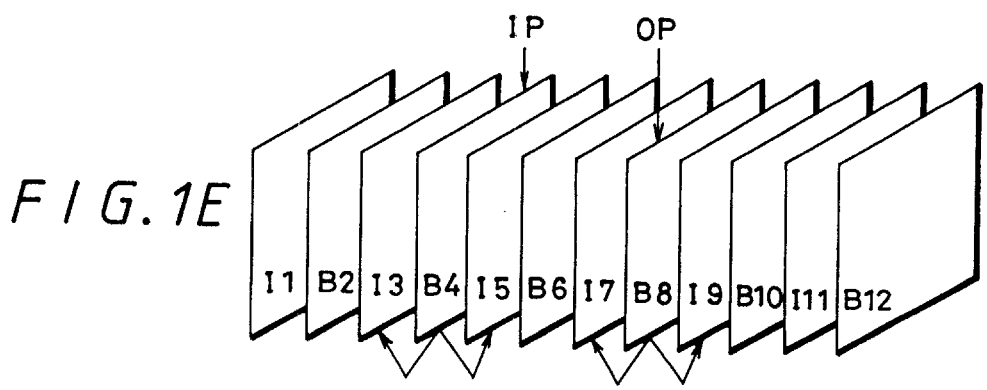
FIG. 1E is a diagram of frames of video signals.

According to the present invention, the editing of compressed and/or encoded signals to enable complete and accurate reproduction is achieved by recording the desired segment of reproduced encoded signals along with segments of encoded signals originally stored adjacent the segment of reproduced encoded signals. Although explained in the following with respect to the editing of video signals reproduced from and recorded to a magnetic tape, the present invention is not so limited. The methods and apparatuses of the present inventions may be applied to any type of encoded signal which may be decoded utilizing other data recorded therewith. Further, the particular type of storage medium from which signals are reproduced and on which signals are recorded does not limit the present invention. For example, the present invention is compatible with recording mediums such as a magnetic disc, an optical disc, a magneto-optical disc, a semiconductor memory, and the like.

An overview of the present invention will be explained in conjunction with FIGS. 2A, 2B, and 2C. FIG. 2A illustrates a magnetic tape 200 from which video signals are to be reproduced and transferred to another magnetic tape 204. The user's designation of two video signal segments AV1 and AV2 for transfer are shown on tape 200. Segment AV1 is bounded by cue-in point IP1 and cue-out point OP1. Segment AV2 is bounded by cue-in point IP3 and cue-out point OP3.

Upon designation of a video signal segment for reproduction, segments of video signals located immediately adjacent the designated segment, referred to as "margin areas," are also marked. FIG. 2B illustrates magnetic tape 200 further having margin areas, represented by stippling, defined thereupon. With regard to segment AV1, a second cue-in point IP2 is set in front of cue-in point IP1, defining a margin area Mf1 therebetween. Also, a second cue-out point OP2 is set behind cue-out point OP1, defining a margin area Mb1 therebetween. In a similar manner, margin areas Mf3 and Mb3 are defined from video signals located immediately adjacent segment AV2. For example, margin area Mf1 may include an I frame needed for decoding a B frame located at point IP1 and margin area Mb1 may include an I frame needed for decoding a B frame located at point OP1.

According to the present invention, reproduction of a user-designated segment of video signals will necessarily include reproduction of both margin areas associated therewith. For example, to reproduce segment AV1 from tape 200, video signals from point IP2 through OP2, including margin areas Mf1 and Mb1, will actually be reproduced from tape 200.

FIG. 2C illustrates a magnetic tape 202 edited according to the present invention. In FIG. 2C, the original content of tape 202 is represented by horizontal wavy lines. As shown, tape 202 has been edited to include user-designated segments AV1 and AV2, along with associated margin areas Mf1, Mb1, Mf3, and Mb3, reproduced from tape 200. To reproduce and display the video signals stored on tape 202, the remaining original content of the tape and each of the user-designated segments and margin areas are initially reproduced. However, only the remaining original content of the tape and the video signals stored in the user-designated segments are actually decoded and displayed to the user. The video signals stored in the margin areas are decoded and utilized in decoding video signals of the user-designated segments, but are not themselves displayed. Optionally, the video signals from the user-designated segments may be decoded and temporarily stored for later display.

Alternatively, as illustrated in FIG. 2D, a tape 204 may be edited according to the present invention to include user-designated segments AV1 and AV2 but without including the associated margin areas. Segments AV1 and AV2, along with the associated margin areas, are reproduced from tape 200. The video signals of the margin areas are decoded and the video signals of the segments AV1 and AV2 are decoded utilizing the data decoded from the corresponding margin areas. The decoded video signals of segments AV1 and AV2 are then encoded again, without reference to the margin areas, and recorded on tape 204 to produce the shown pattern of data without margin areas.

FIG. 3 illustrates an editing system 300 according to the present invention. Editing system 300 includes a reproducing device 302, a memory 304, a decoder 306, an output device 308, a controller 310, and an input device 314. Reproducing device 302 reproduces video signals recorded on a recording medium (not shown) and supplies the reproduced video signals to memory 304. Memory 304 is a conventional storage device, such as a semiconductor memory or a magnetic disc, for storing reproduced video signals. Decoder 306 is a conventional decoding device for decoding reproduced video signals and for providing decoded video signals to output device 308. Output device 308 is a conventional output device.

Controller 310 is coupled to each of reproducing device 302, memory 304, decoder 306, and output device 308 and controls the operation of each. Controller 310 includes a margin adding device 312 which determines the location and extent of margin areas adjacent user-designated segments of video signals. Controller 310 may comprise a microprocessor. Input device 314, coupled to controller 310, receives commands from a user and supplies the user commands to controller 310 and may comprise a conventional user interface device, such as a keypad, keyboard, remote control device, or the like. Input device 314 may also include a display device for displaying reproduced video signals or other information to a user.

In operation, a user enters a cue-in command and a cue-out command into input device 314 to designate a particular segment of video signals for editing. Input device 314 forwards the commands to controller 310 which stores the corresponding cue-in point IP1 and cue-out point OP1. Margin adding device 312 generates a second cue-in point IP2 located before point IP1 by a margin Mf1. Device 312 also generates a second cue-out point OP2 located behind point OP1 by a margin Mb1.

Controller 310 controls reproducing device 302 to reproduce video signals from point IP2 to point OP2 from the recording medium. Memory 304 is controlled to store reproduced video signals for decoding by decoder 306. Decoder 306 decodes the reproduced video signals and supplies the decoded video signals to output device 308. Controller 310 controls output device 308 to output only those decoded video signals having time code data corresponding to the segment defined by IP1 and OP1. In this manner, the user-designated segment of video signals is properly decoded and output. The video signals stored in the margin areas are reproduced, decoded, and used to decode the user-designated segment of video signals, but are not output.

Optionally, a conventional storage device (not shown) may be coupled to output device 308 to store the decoded segment of user-designated video signals on a recording medium. The recording medium utilized in this optional embodiment corresponds to that illustrated in FIG. 2D.

In an alternate embodiment, output device 308 is omitted. Decoded video data corresponding to both the user-designated segment of video signals and the associated margin areas are output by decoder 306. The decoded signals may be recorded in their entirety on a recording medium (not shown) and from such a recording a complete and accurate reproduction of the user-designated segment of video signals may be achieved. The recording medium utilized in this alternate embodiment corresponds to that illustrated in FIG. 2C.

Figure 4:
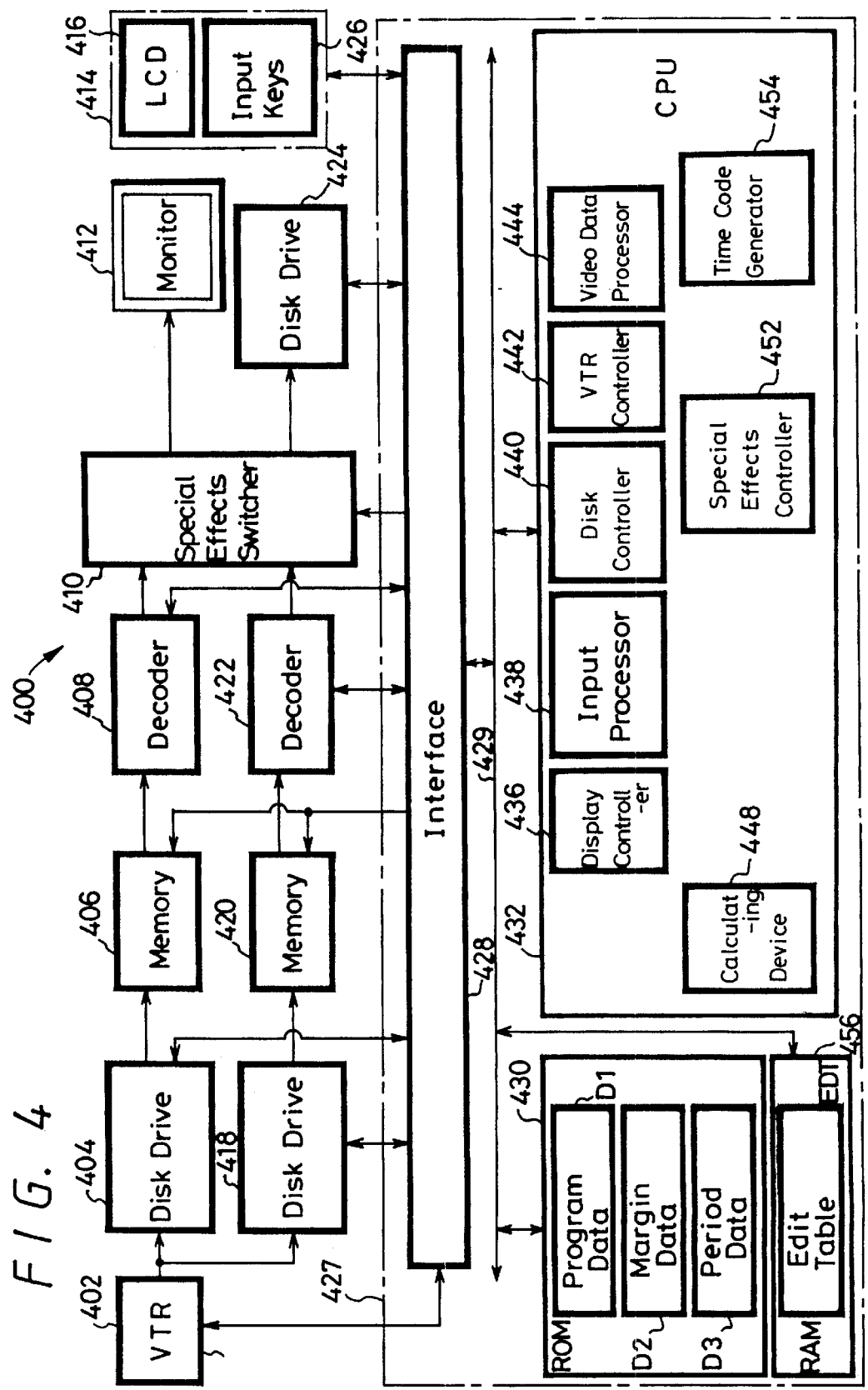
FIG. 4 is a block diagram of an editing system according to another embodiment of the present invention.

FIG. 4 illustrates editing system 400 according to another embodiment of the present invention. Editing system 400 includes a video tape recorder (VTR) 402; disk drives 404, 418, and 424; memories 406 and 420; decoders 408 and 422; a special effects switcher 410; a monitor 412; an input device 414; and a controller 427. Input device 414 includes liquid crystal display (LCD) 416 and input keys 426. Controller 427 includes interface 428, data bus 429, ROM 430, CPU 432, and RAM 456.

VTR 402 is a conventional video tape recorder for reproducing video signals from a magnetic storage tape (not shown). Disk drives 404 and 418 are conventional disk drive devices for storing video signals reproduced by VTR 402. Memories 406 and 420 are storage devices for storing video signals reproduced by disk drives 404 and 418, respectively. Decoders 408 and 422 are conventional decoding devices for decoding reproduced video signals supplied by memories 406 and 420, respectively, and for supplying decoded video signals to special effects switcher 410.

Special effects switcher 410 is a special effects switcher for creating special effects such as mixing video signals, wiping an image, dissolving from one image to another image, and the like. Monitor 412 is a conventional display device such as a television. Disk drive 424 is a conventional storage device for storing video signals supplied from special effects switcher 410. Input device 414 is a conventional user interface device. LCD 416 displays to a user images, such as a menu, time code information, and the like. Input keys 426 include a number of keys operable by a user to enter commands to control editing system 400.

Controller 427 is coupled to and controls the operation of each of VTR 402; disk drives 404, 418, and 424; memories 406 and 420; decoders 408 and 422; special effects switcher 410; and input device 414. Specifically, interface 428, a conventional interface device, is coupled to each of the aforementioned devices. Each of interface 427, ROM 430, CPU 432, and RAM 456 are coupled to data bus 429. Data bus 429 is a conventional bus system for carrying data, address information, control information, and the like.

ROM 430 is a conventional read-only memory device for storage of data and may include a semiconductor memory and the like. Prestored in ROM 430 are program data D1, margin data D2, and period data D3. Program data D1 is program information which CPU 432 utilizes to implement edit processing functions. Margin data D2 is information regarding the calculation of margins. Period data D3 is period information indicating the timing for special effects processing.

RAM 456 is a conventional random-access memory device for storage of data and may include a semiconductor memory and the like. RAM 456 stores program data D1 supplied from ROM 430 and an edit table. The contents of the edit table varies during edit processing.

CPU 432 includes display controller 436, input processor 438, disk controller 440, VTR controller 442, video data processor 444, calculating device 448, special effects controller 452, and time code generator 454. Preferably, CPU 432 comprises a software-controlled microprocessor device.

Display controller 436 controls LCD 416 to display to a user menu data, time code data, and the like. Input processor 438 processes commands input by a user into input device 414. Disk controller 440 controls the reproduction and recording functions of disk drives 404, 418, and 424. VTR controller 442 controls operations of VTR 402 such as playback, fast-forward, rewind, record, and the like. Video data processor 444 extracts time code data and header data from video signals.

Calculating device 448 performs calculations utilizing time code data and margin data. Special effects controller 452 controls the operation of special effects switcher 410. Time code generator 454 generates time code data for recording by disk drive 424 along with the recording of other data.

FIG. 5 illustrates a preferred format for an editing table 500 stored in RAM 456. Editing table 500 stores information regarding each segment of video signals to be processed during an editing operation. For each segment, a device identification code, a segment identification code, first and second cue-in time codes (TCin1 and TCout2), a start point time code (TCF), a cue-in address (ADin), a length (LENGTH), first and second cue-in time codes (TCout1 and TCout2), and a flag (FLG) are stored in a particular area of editing table 500. The device identification code identifies the device, e.g. disk drive 404 or 418, which stores the segment. The segment identification code identifies the particular segment.

A first cue-in time code TCin1 indicates the time code at which a first cue-in point is located in the reproduced video signals. A second cue-in time code TCin2 indicates the time code at which a second cue-in point is located in the reproduced video signals. The second cue-in point is positioned in front of the first cue-in point at a distance set in accordance with margin data D2 stored in ROM 430. The start point time code TCf indicates the starting point for video special effects in an A/B roll editing process or the starting point for playback of another segment of video signals in a cut editing process.

The cue-in address ADin represents the address of cue-in the disk drive 404 or 418. The length LENGTH represents the duration of the segment which is stored starting at the address ADin. A first cue-out time code TCout1 indicates the time code at which a first cue-out point is located in the reproduced video signals. A second cue-out time code TCout2 indicates the time code at which a second cue-out point is located in the reproduced video signals. The second cue-out point is positioned behind the first cue-out point at a distance set in accordance with margin data D2 stored in ROM 430. The flag FLG represents order data in a cut editing process.

Figure 6:
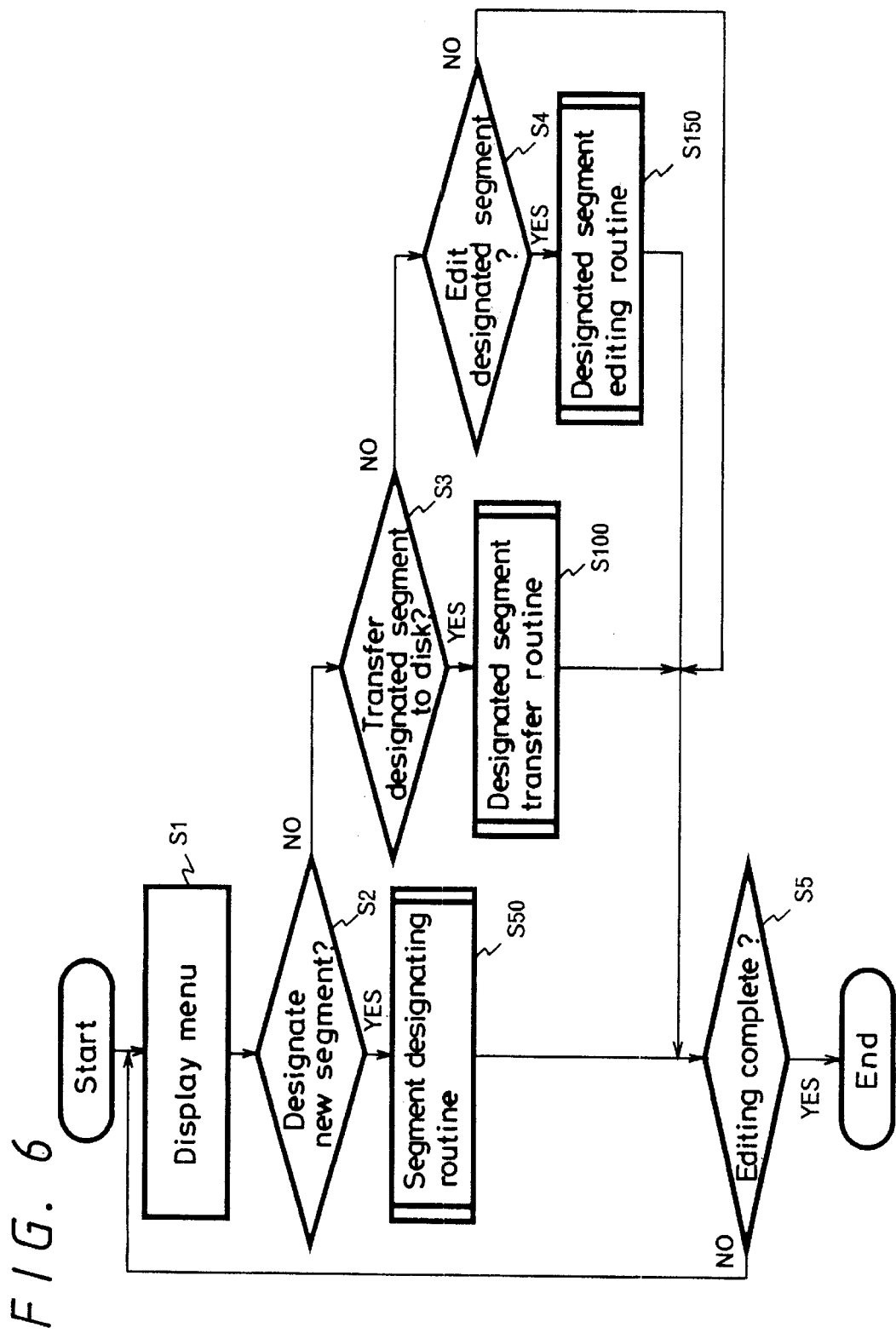
FIG. 6 is a flow chart to which reference will be made in describing an operation of the editing system of FIG. 4.

Operation of editing system 400 is described in conjunction with the flow chart of FIG. 6. In step S1, CPU 432 retrieves from ROM 430 menu image data included in program data D1. Display controller 436 processes the menu image data into a form suitable for an LCD and supplies the processed image data to LCD 416 via bus 429 and interface 428. Accordingly, LCD 416 displays a menu to a user. Processing proceeds with step S2.

In step S2, a user enters commands through input keys 426 instructing whether a new segment of video signals is to be designated by the user. Input device 414 transmits the user's commands to input processor 438 via interface 428 and bus 429. If the user's commands indicate that a new segment of video signals is to be designated by the user, then processing proceeds with step S50; otherwise, processing continues with step S3.

In step S50 processing continues in accordance with a segment designating routine to be described in detail hereinbelow in connection with FIG. 7. Thereafter, processing continues with step S5.

In step S5, the user enters a command through input keys 426 to continue the editing process or to end the editing process. Input device 414 transmits the user's commands to input processor 438 via interface 428 and bus 429. If the user's commands indicate that the editing process is to continue, then processing proceeds with step S1; otherwise, the editing processing of CPU 432 ends. By continuing the editing process repeatedly, repeated processing according to steps S50, S100, and S150 can be achieved.

In step S3, a user enters commands through input keys 426 instructing whether an already designated segment of video signals is to be transferred from the magnetic tape to a disk drive for editing. Input device 414 transmits the user's commands to input processor 438 via interface 428 and bus 429. If the user's commands indicate that a designated segment of video signals is to be transferred, then processing proceeds with step S100; otherwise, processing continues with step S4.

In step S100 processing continues in accordance with a designated segment transfer routine to be described in detail hereinbelow in connection with FIGS. 8A and 8B. Thereafter, processing continues with step S5.

In step S4, a user enters commands through input keys 426 instructing whether an already designated segment of video signals is to be edited. Input device 414 transmits the user's commands to input processor 438 via interface 428 and bus 429. If the user's commands indicate that a designated segment of video signals is to be edited, then processing proceeds with step S150; otherwise, processing continues with step S5.

In step S150 processing continues in accordance with a designated segment editing routine to be described in detail hereinbelow in connection with FIG. 9. Thereafter, processing continues with step S5.

Figure 7:
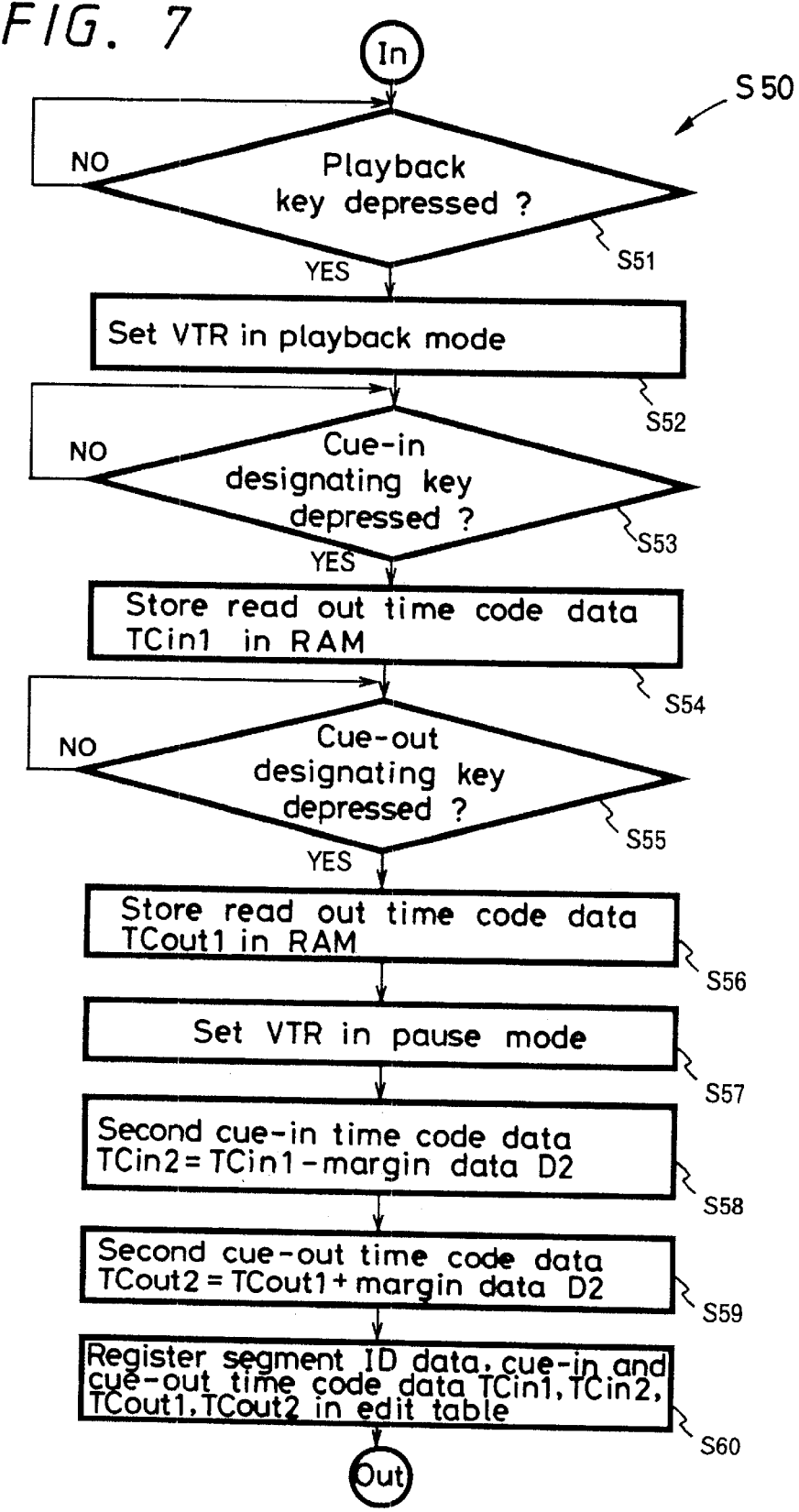
FIG. 7 is a flow chart to which reference will be made in describing an operation of the editing system of FIG. 4.

FIG. 7 illustrates a preferred operating process for a segment designating routine step S50. As shown, step S50 includes steps S51-S60. In step S51, CPU 432 awaits a VTR playback command from the user. Upon receipt of the playback command, processing in CPU 432 proceeds with step S52.

In step S52, VTR controller 442 supplies a playback control signal to VTR 402 via bus 429 and interface 428. In response to the playback control signal, VTR 402 commences reproduction of video signals from a recording medium (not shown) and supplies the reproduced video signals to disk drive 404. VTR 402 also supplies time code data to controller 427 for storage in RAM 456. CPU 432 controls disk drive 404, memory 406, and decoder 408 to decode the reproduced video signals for display. Special effects switcher 410 is controlled to pass the decoded video signals to monitor 412 for display to the user. Processing proceeds with step S53.

In step S53, CPU 432 awaits a cue-in designation command from the user. Upon receipt of the cue-in designation command, processing in CPU 432 proceeds with step S54. In step S54, time code data received from VTR 402 corresponding to the user's designation of a cue-in point is stored in RAM 456 as TCin1 data. Processing proceeds with step S55.

In step S55, CPU 432 awaits a cue-out designation command from the user. Upon receipt of the cue-out designation command, processing in CPU 432 proceeds with step S56. In step S56, time code data received from VTR 402 corresponding to the user's designation of a cue-out point is stored in RAM 456 as TCout1 data. Processing proceeds with step S57.

In step S57, VTR controller 442 controls VTR 402 to pause its reproduction operation. Processing proceeds with step S58. In step S58, the first cue-in time code data TCin1 is retrieved from RAM 456 and margin data D2 is retrieved from ROM 430. The TCin1 data and the margin data D2 are supplied to calculating device 448. Calculating device 448 calculates a value for TCin2 data as the difference between the TCin1 data and the margin data D2, e.g. TCin2=TCin1−D2. The calculated second cue-in time code data TCin2 is supplied to RAM 456 for storage. Processing continues with step S59.

In step S59, the first cue-out time code data TCout1 is retrieved from RAM 456 and margin data D2 is retrieved from ROM 430. The TCout1 data and the margin data D2 are supplied to calculating device 448. Calculating device 448 calculates a value for TCout2 data as the sum of the TCout1 data and the margin data D2, e.g. TCout2=TCout1 +D2. The calculated second cue-out time code data TCout2 is supplied to RAM 456 for storage. Processing continues with step S60.

In step S60, CPU 432 generates a segment identification code identifying the designated segment of video signals. The segment identification code is supplied to RAM 456. CPU 432 controls RAM 456 to store the segment identification code, the first and second cue-in time codes, and the first and second cue-out time codes in corresponding areas of editing table 500. The segment designating routine step S50 then ends.

Figure 8A:
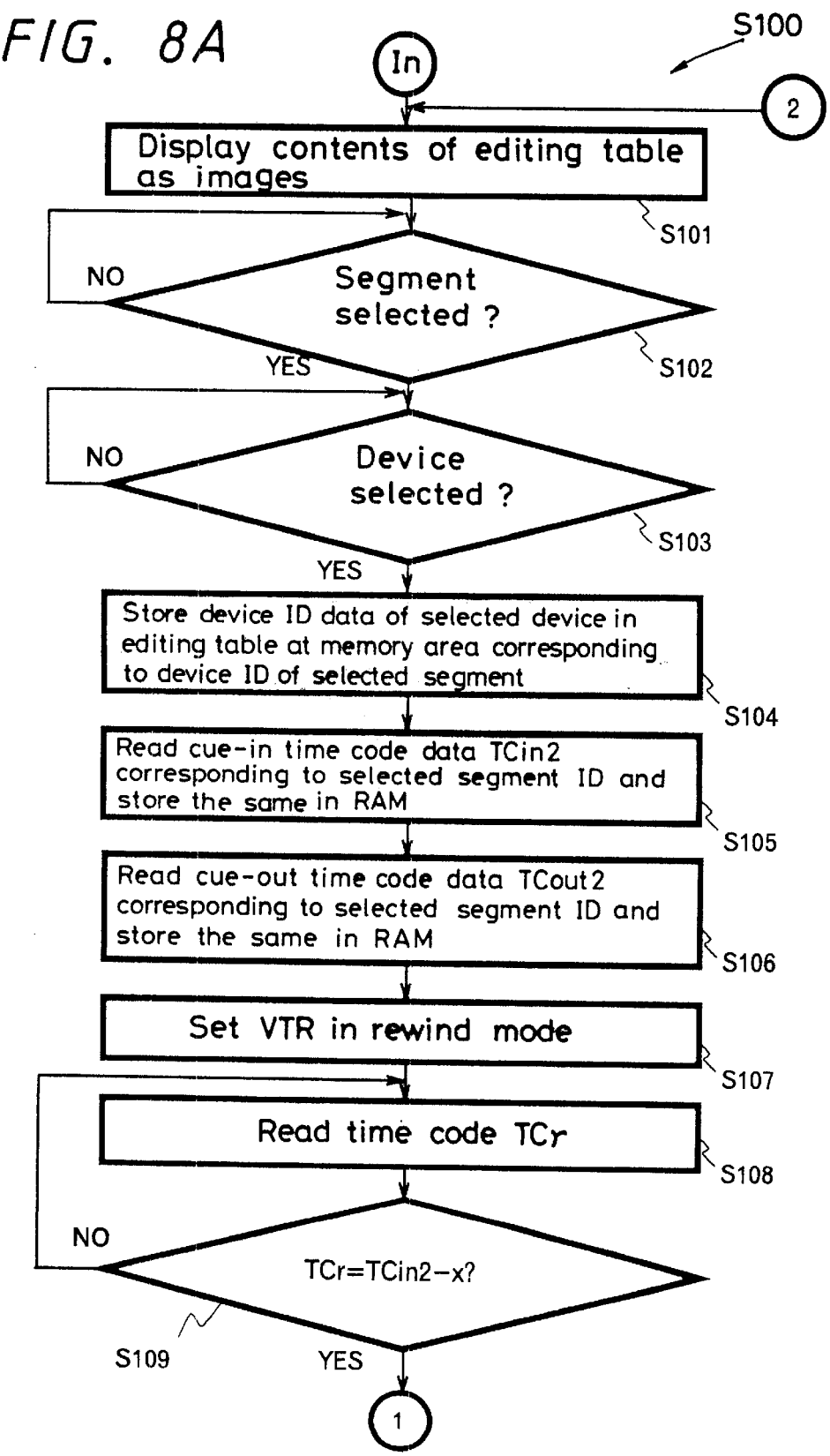
FIGS. 8A and 8B are flow charts to which reference will be made in describing an operation of the editing system of FIG. 4.
Figure 8B:
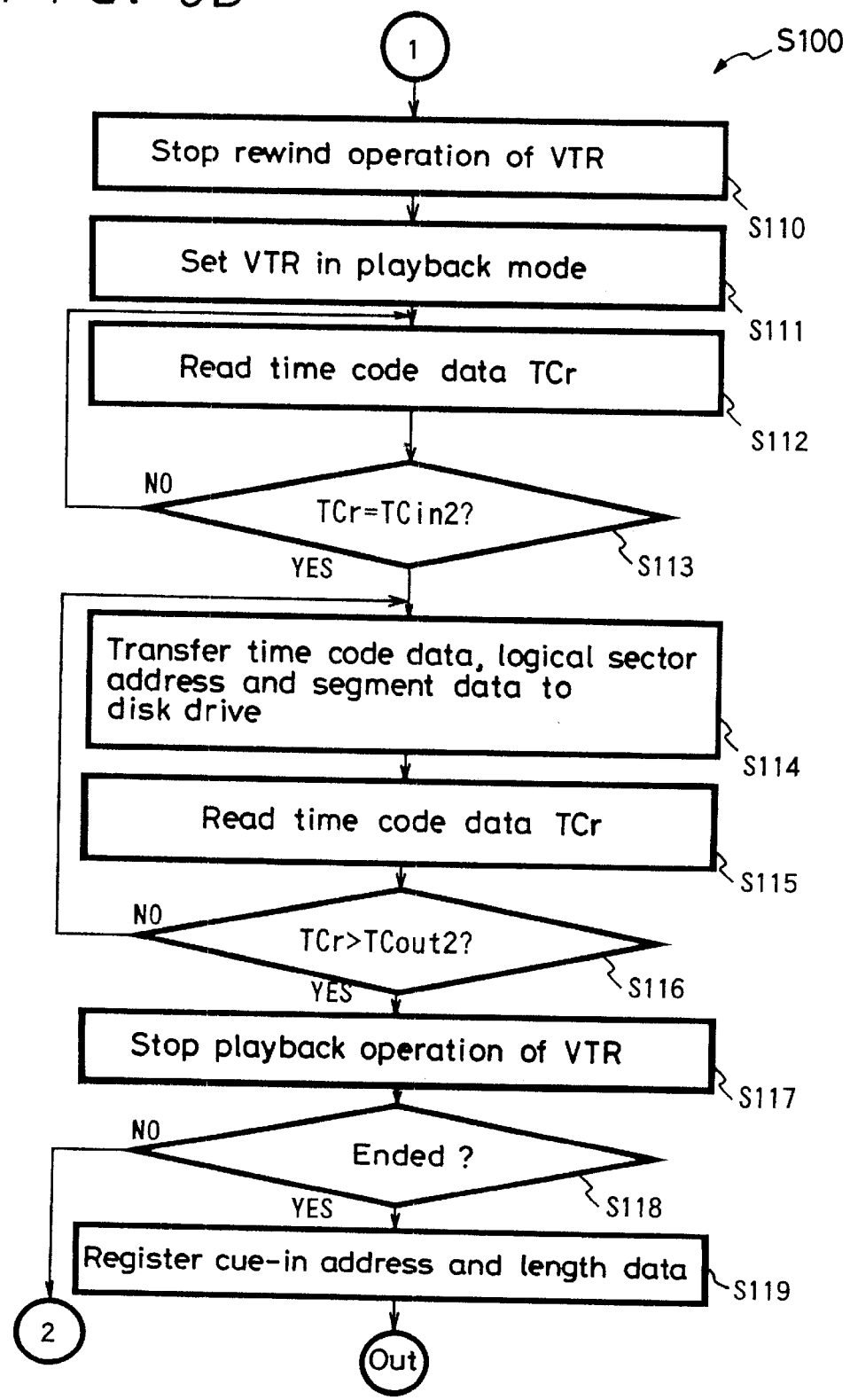

FIGS. 8A and 8B illustrate a preferred operating process for a designated segment transfer routine step S100. As shown, step S100 includes steps S101–S119. In step S101, CPU 432 retrieves from RAM 456 data stored in the edit table. Display controller 436 processes the edit table data into a form suitable for an LCD and supplies the processed edit table data to LCD 416 via bus 429 and interface 428. Accordingly, LCD 416 displays the edit table data to the user. Processing proceeds with step S102.

In step S102, CPU 432 awaits the user's selection of a segment of video signals from among the segments listed in the edit table data displayed to the user. The user's selection may be indicated by an operation of input keys 426 corresponding to the selected segment. Upon receipt of the user's selection, the segment identification code corresponding to the selected segment is stored in RAM 456. Processing proceeds with step S103.

In step S103, CPU 432 awaits the user's selection of a device in which the selected segment is to be recorded. The user may select from among a number of devices displayed on LCD 416 or, alternatively, may enter a device identification code directly. The user's selection may be indicated by an operation of input keys 426 corresponding to the selected device. Upon receipt of the user's selection, the device identification code corresponding to the selected device is stored in RAM 456. Processing proceeds with step S104.

In step S104, the device identification code corresponding to the selected device is stored in an area of the editing table in RAM 456 corresponding to the selected segment. Processing proceeds with step S105.

In step S105, the second cue-in time code data TCin2 corresponding to the selected segment is retrieved from the editing table in RAM 456 utilizing the corresponding segment identification code. Processing proceeds with step S106 in which the second cue-out time code data TCout2 corresponding to the selected segment is retrieved from the editing table in RAM 456 utilizing the corresponding segment identification code. Processing proceeds with step S107.

In step S107, VTR controller 442 controls VTR 402 via bus 429 and interface 428 to commence a rewind operation. During the rewind operation, VTR 402 supplies time code data TCr to RAM 456 for storage. Processing proceeds with step S108.

In step S108, video data processor 444 retrieves time code data TCr from RAM 456. Processing continues with step S109 in which time data "x" comprising a preroll time and an actuation time for commencing an operation of VTR 402 is retrieved from ROM 430. Also, the second cue-in time code TCin2 is retrieved from RAM 456. Calculating device 448 calculates the difference between time code TCin2 and time data "x" to produce a difference. If the difference equals the time code data TCr, then processing proceeds with step S110; otherwise, processing returns to step S108.

In step S110, VTR controller 442 controls VTR 402 via bus 429 and interface 428 to end the rewind operation. Processing proceeds with step S111 in which VTR controller 442 controls VTR 402 via bus 429 and interface 428 to commence a playback operation. During the playback operation, VTR 402 supplies time code data TCr to RAM 456 for storage. Processing proceeds with step S112.

In step S112, video data processor 444 retrieves time code data TCr from RAM 456. Processing proceeds with step S113 in which CPU 432 determines if the retrieved time code data TCr is equal to the second cue-in time code TCin2. If TCr equals TCin2, processing proceeds with step S114; otherwise, processing returns to step S112.

In step S114, disk controller 440 retrieves from RAM 456 the device identification code corresponding to the selected device. Disk controller 440 generates logical sector address data, corresponding to locations on the selected device, and corresponding length data. For example, length data may be determined in units of logical sector size, e.g. 512 bytes. The first logical sector address will correspond to the address of the cue-in point for the selected segment. The logical sector address data and length data are supplied to the selected device, e.g. disk drive 404 or 418, via bus 429 and interface 428. Video signals reproduced by VTR 402 are supplied to the selected device for recording. Disk controller 440 controls the recording process in accordance with the length data stored in the editing table in RAM 456 corresponding to the selected segment. Processing continues with step S115.

In step S115, video data processor 444 retrieves time code data TCr from RAM 456. Processing proceeds with step S116 in which CPU 432 determines if the retrieved time code data TCr is greater than the second cue-out time code TCout2. If TCr is greater than TCout2, processing proceeds with step S117; otherwise, processing returns to step S114.

In step S117, VTR controller 442 controls VTR 402 via bus 429 and interface 428 to end its playback operation. Processing continues with step S118.

In step S118, CPU 432 retrieves from ROM 430 message data included in program data D1. Display controller 436 processes the message data into a form suitable for an LCD and supplies the processed message data to LCD 416 via bus 429 and interface 428. Accordingly, LCD 416 displays a message, such as "End?", to the user. The user enters commands through input keys 426 instructing whether additional segments are to be transferred from the recording medium to a disk drive. Input device 414 transmits the user's commands to input processor 438 via interface 428 and bus 429. If the user's commands indicate that additional segments are to be transferred, then processing proceeds with step S101; otherwise, processing continues with step S119. By indicating that additional segments are to be transferred, the user can control editing system 400 to transfer multiple segments of video signals to disk drives 404 and 418 and to log corresponding identification information in the editing table stored in RAM 456.

In step S119, disk controller 440 supplies logical sector address data corresponding to the cue-in address, e.g. TCin2 and LENGTH, to RAM 456 for storage in the editing table. Step S119 completes step S100. Optionally, the order of step S118 and S119 may be inverted so that processing according to step S119 occurs before and is followed by processing according to step S118.

Figure 9:
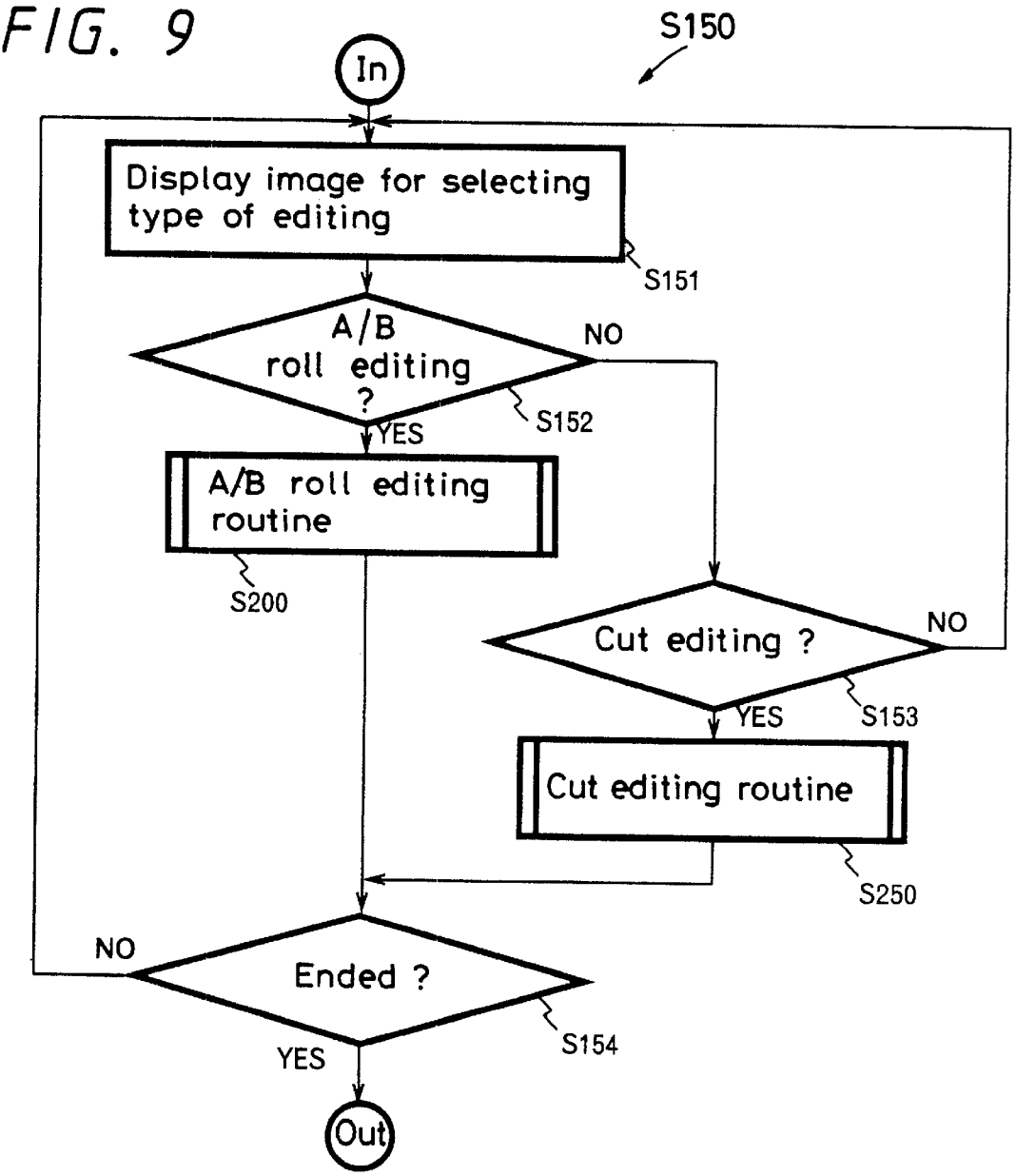
FIG. 9 is a flow chart to which reference will be made in describing an operation of the editing system of FIG. 4.
Figure 10A:
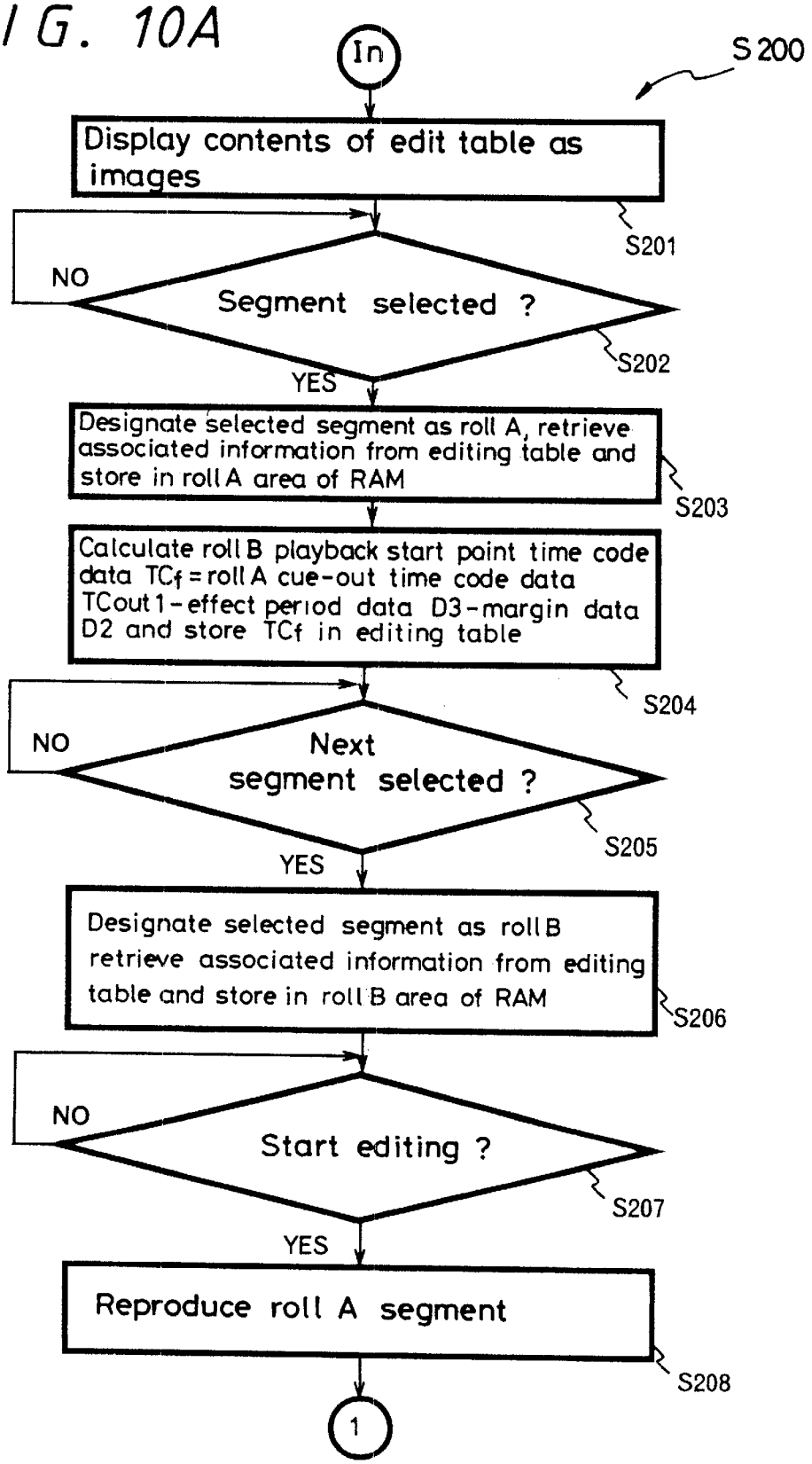
Figure 10B:
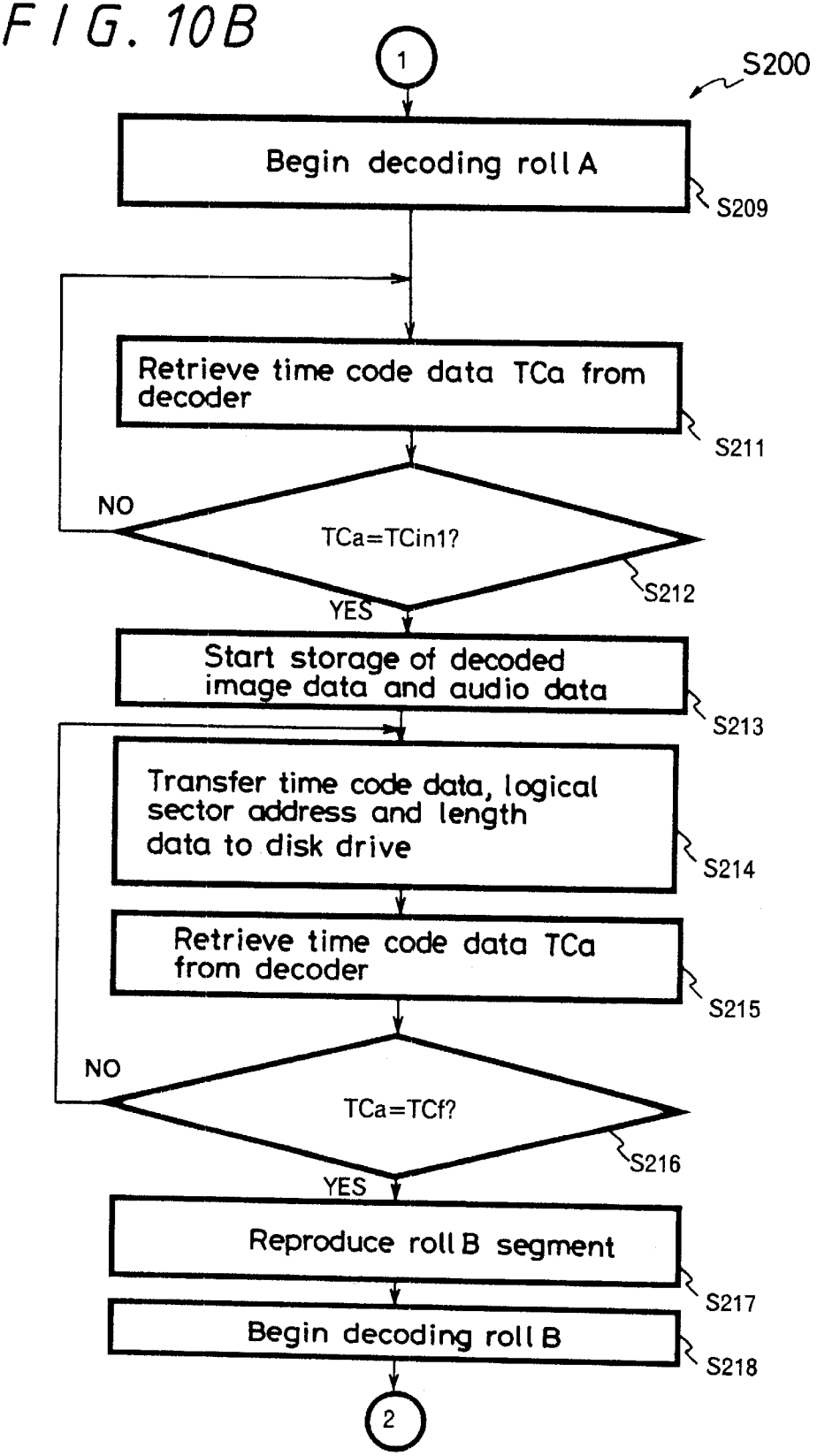
Figure 10D:
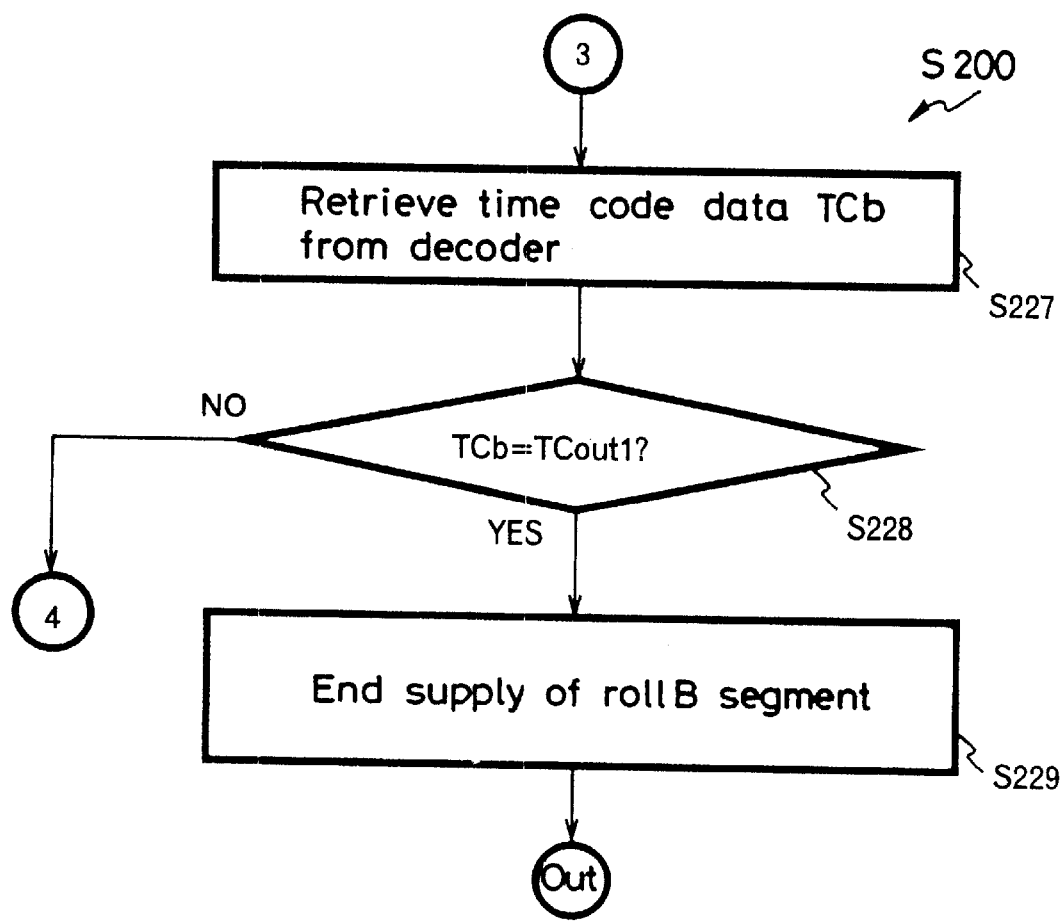

FIG. 9 illustrates a preferred operating process for a designated segment editing routine step S150. As shown, step S150 includes steps S151–S154, S200, and S250. In step S151, CPU 432 retrieves from RAM 456 editing process selection data. Display controller 436 processes the editing process selection data into a form suitable for an LCD and supplies the processed data to LCD 416 via bus 429 and interface 428. Accordingly, LCD 416 displays the editing process selection data to the user. Processing continues with step S152.

In step S152, the user enters commands through input keys 426 instructing whether A/B roll editing is desired. Input device 414 transmits the user's commands to input processor 438 via interface 428 and bus 429. If the user's commands indicate that A/B roll editing is desired, then processing proceeds with step S200; otherwise, processing continues with step S153.

In step S200, processing continues in accordance with an A/B roll editing routine to be described in detail hereinbelow in connection with FIGS. 10A, 10B, 10C, and 10D. Thereafter, processing continues with step S154.

In step S153, the user enters commands through input keys 426 instructing whether cut editing is desired. Input device 414 transmits the user's commands to input processor 438 via interface 428 and bus 429. If the user's commands indicate that cut editing is desired, then processing proceeds with step S250; otherwise, processing returns to step S151.

In step S250, processing continues in accordance with a cut editing routine to be described in detail hereinbelow in connection with FIGS. 11A, 11B, and 11C. Thereafter, processing continues with step S154.

In step S154, CPU 432 retrieves from ROM 430 message data included in program data D1. Display controller 436 processes the message data into a form suitable for an LCD and supplies the processed message data to LCD 416 via bus 429 and interface 428. Accordingly, LCD 416 displays a message, such as "End?", to the user. The user enters commands through input keys 426 instructing whether additional segment editing is desired. Input device 414 transmits the user's commands to input processor 438 via interface 428 and bus 429. If the user's commands indicate that additional editing is desired, then processing proceeds with step S151; otherwise, processing according to step S150 is complete.

FIGS. 10A, 10B, 10C, and 10D illustrate a preferred operating process for an A/B roll editing routine step S200. As shown, step S200 includes steps S201–209 and S211–S229. As a point of reference, the following discussion presumes that a video segment comprising an "A roll" is stored in disk drive 404 and that a video segment comprising a "B roll" is stored in disk drive 418. The process of storing video segments on a disk drive as been described in detail hereinabove.

In step S201, CPU 432 retrieves from RAM 456 editing table data. Display controller 436 processes the editing table data into a form suitable for an LCD and supplies the processed editing table data to LCD 416 via bus 429 and interface 428. Accordingly, LCD 416 displays an image corresponding to the editing table data to the user. Processing continues with step S202.

In step S202, CPU 432 awaits the user's selection of a segment of video signals from among the segments listed in the edit table data displayed to the user. The user's selection may be indicated by an operation of input keys 426 corresponding to the selected segment. Upon receipt of the user's selection, the segment identification code corresponding to the selected segment is stored in RAM 456. Processing proceeds with step S203.

In step S203, CPU 432 retrieves from RAM 456 the segment identification code corresponding to the selected segment. CPU 432 also retrieves from the editing table in RAM 456 all information associated with the retrieved segment identification code. Such information is stored in a ROLL A storage area (not shown) within RAM 456. Processing proceeds with step S204.

In step S204, CPU 432 retrieves from the ROLL A storage area first cue-out time code data TCout1 and retrieves from ROM 430 margin data D2 and effect period data D3. TCout1, margin data D2, and effect period data D3 are supplied to calculating device 448. Calculating device 448 sums margin data D2 and effect period data D3 to produce a sum value. The sum value is subtracted from TCout1 to produce a difference value which is supplied to RAM 456 for storage. The difference value is stored in the editing table in RAM 456 in a start point time code TCf area associated with roll B to indicate the start point of roll B playback. Processing proceeds with step S205.

In step S205, CPU 432 awaits the user's selection of a second segment of video signals from among the segments listed in the edit table data displayed to the user. The second selected segment may be the same as the first selected segment. The user's selection may be indicated by an operation of input keys 426 corresponding to the second selected segment. Upon receipt of the user's selection, the segment identification code corresponding to the second selected segment is stored in RAM 456. Processing proceeds with step S206.

In step S206, CPU 432 retrieves from RAM 456 the segment identification code corresponding to the second selected segment. CPU 432 also retrieves from the editing table in RAM 456 all information associated with the retrieved segment identification code. Such information is stored in a ROLL B storage area (not shown) within RAM 456. Processing proceeds with step S207.

In step S207, CPU 432 awaits the user's entry of a command to commence the editing process. The user enters commands through input keys 426 to control commencement of the editing process. Input device 414 transmits the user's commands to input processor 438 via interface 428 and bus 429. If the user's commands indicate that the editing process is to commence, then processing proceeds with step S208.

In step S208, CPU 432 retrieves from the ROLL A storage area the device identification code, the cue-in address ADin and the length LENGTH for supply to disk controller 440. Disk controller 440 generates logical sector address data and length data from the cue-in address for supply to the device corresponding to the device identification code, e.g. disk drive 404. (To facilitate explanation it will be assumed in the following that disk drive 404 actually corresponds to the retrieved device identification code for roll A.) Disk drive 404 is controlled, in accordance with the length data stored in the ROLL A storage, to reproduce the corresponding segment of video signals from a recording medium and supply the reproduced video signals to memory 406. Processing proceeds with step S209.

In step S209, memory 406 stores the reproduced video signals and supplies the stored video signals, as needed, to decoder 408. Decoder 408 decodes the reproduced video signals in accordance with GOP header data and type-of-picture data included in the reproduced video signals. Decoded image data and audio data from the decoded video signals are supplied to special effects switcher 410. Decoded time code data TCa is supplied to controller 427. The decoded time code data TCa is stored in RAM 456. Special effects controller 452 controls special effects switcher 410 to route the decoded image data and audio data to disk drive 424.

In the following step S211, time code data TCa is retrieved from RAM 456 by CPU 432. Processing proceeds with step S212.

In step S212, CPU 432 retrieves first cue-in time code data TCin1 from the ROLL A area of RAM 456. CPU 432 determines whether time code data TCa and the retrieved time code data TCin1 are equal. If TCa equals TCin1, then processing proceeds with step S213; otherwise, processing returns to step S211.

In step S213, disk controller 440 controls disk drive 424 to commence storing decoded image data and audio data supplied by decoder 408 through special effects switcher 410. In the following step S214, time code generator 454 generates time code data for supply to disk drive 424. Disk controller 440 generates logical sector address data and length data also for supply to disk drive 424. Disk drive 424 stores the decoded image data and audio data in association with the corresponding time code data. Processing continues with step S215.

In step S215, time code data TCa is retrieved from RAM 456 by CPU 432. The time code data TCa is updated by decoder 408 as the decoding process progresses. Processing proceeds with step S216.

In step S216, CPU 432 retrieves from RAM 456 start point time code TCf associated with roll B. CPU 432 determines whether time code data TCa equals the retrieved time code data TCf. If time code data TCa equals time code data TCf, then processing proceeds with step S217; otherwise, processing returns to step S214.

In step S217, CPU 432 retrieves from the ROLL B storage area the device identification code, the cue-in address ADin and the length LENGTH for supply to disk controller 440. Disk controller 440 generates logical sector address data and length data from the cue-in address for supply to the device corresponding to the device identification code, e.g. disk drive 418. (To facilitate explanation it will be assumed in the following that disk drive 418 actually corresponds to the retrieved device identification code for roll B.) Disk drive 404 is controlled, in accordance with the length data stored in the ROLL B storage, to reproduce the corresponding segment of video signals from a recording medium and supply the reproduced video signals to memory 420. Processing proceeds with step S218.

In step S218, memory 420 stores the reproduced video signals and supplies the stored video signals, as needed, to decoder 422. Decoder 422 decodes the reproduced video signals in accordance with GOP header data and type-of-picture data included in the reproduced video signals. Decoded image data and audio data from the decoded video signals are supplied to special effects switcher 410. Decoded time code data TCb is supplied to controller 427. The decoded time code data TCb is stored in RAM 456. Special effects controller 452 controls special effects switcher 410 to route the decoded image data and audio data to disk drive 424. Processing proceeds with step S219.

In step S219, time code data TCb is retrieved from RAM 456 by CPU 432. Processing proceeds with step S220.

In step S220, CPU 432 retrieves first cue-in time code data TCin1 from the ROLL B area of RAM 456. CPU 432 determines whether TCin1 and TCb are equal. If TCb equals TCin1, then processing proceeds with step S221; otherwise, processing returns to step S219.

In step S221, special effects controller 452 controls special effects switcher 410 to supply to disk drive 424 decoded image data and audio data from roll B along with decoded image data and audio data from roll A. In accordance with user commands, special effects switcher 410 may transmit data from roll A and roll B in a certain order, mix such data, or incorporate such data into a wipe or dissolve special effect. Other conventional combinations of image data and audio data may also be implemented in special effects switcher 410. Processing proceeds with step S222.

In step S222, time code generator 454 generates time code data for supply to disk drive 424. Disk controller 440 generates logical sector address data and length data also for supply to disk drive 424. Disk drive 424 stores the decoded image data and audio data supplied by special effects switcher 410 in association with the corresponding time code data. Processing continues with step S223.

In step S223, time code data TCa is retrieved from RAM 456 by CPU 432. The time code data TCa is updated by decoder 408 as the decoding process progresses. Processing proceeds with step S224.

In step S224, CPU 432 retrieves from RAM 456 first cue-out time code data TCout1 associated with roll A. CPU 432 determines whether time code data TCa equals the retrieved time code data TCout1. If time code data TCa equals time code data TCout1, then processing proceeds with step S225; otherwise, processing returns to step S222.

In step S225, special effects controller 452 controls special effects switcher 410 to discontinue the supply of roll A decoded image data and audio data to disk drive 424. Special effects switcher 410 may continue to supply roll B decoded image data and audio data to disk drive 424. Processing continues with step S226.

In step S226, time code generator 454 generates time code data for supply to disk drive 424. Disk controller 440 generates logical sector address data and length data also for supply to disk drive 424. Disk drive 424 stores the decoded image data and audio data supplied by special effects switcher 410 in association with the corresponding time code data. Processing continues with step S227.

In step S227, time code data TCb is retrieved from RAM 456 by CPU 432. The time code data TCb is updated by decoder 422 as the decoding process progresses. Processing proceeds with step S228.

In step S228, CPU 432 retrieves from RAM 456 first cue-out time code data TCout1 associated with roll B. CPU 432 determines whether time code data TCb equals the retrieved time code data TCout1. If time code data TCb equals time code data TCout1, then processing proceeds with step S229; otherwise, processing returns to step S226.

In step S229, special effects controller 452 controls special effects switcher 410 to cease the supply of roll B decoded image data and audio data to disk drive 424, thereby completing step S200.

FIGS. 11A, 11B, and 11C illustrate a preferred operating process for a cut editing routine step S250. As shown, step S250 includes steps S251–S266 and S268–S275. As a point of reference, the following discussion presumes that two video segments, a first segment and a second segment, are stored adjacent one another in disk drive 424. Also, the first segment is stored in disk drive 404 and the second segment is stored in disk drive 418.

In step S251, CPU 432 retrieves from RAM 456 editing table data. Display controller 436 processes the editing table data into a form suitable for an LCD and supplies the processed editing table data to LCD 416 via bus 429 and interface 428. Accordingly, LCD 416 displays an image corresponding to the editing table data to the user. Processing continues with step S252.

In step S252, CPU 432 supplies a value"1" for storage in RAM 456 as an order data number (order data NO). The value of the order data NO assigned to a video signal segment will correspond to the relative order with which the segment will be assembled with other segments in a cut editing process. Processing proceeds with step S253.

In step S253, CPU 432 awaits the user's selection of a segment of video signals from among the segments listed in the edit table data displayed to the user. The user's selection may be indicated by an operation of input keys 426 corresponding to the selected segment. Upon selection of a segment, processing continues with step S254.

In step S254, the segment identification code corresponding to the selected segment is supplied to CPU 432. CPU 432 retrieves from RAM 456 the order data NO. CPU 432 replaces the flag value FLG corresponding to the selected segment, and stored in the flag data area of the editing table in RAM 456, with the value of the order data NO. Processing proceeds with step S255 in which the value of order data NO stored in RAM 456 is incremented by one. Processing continues with step S256.

In step S256, the user enters commands through input keys 426 to control commencement of the editing process. Input device 414 transmits the user's commands to input processor 438 via interface 428 and bus 429. If the user's commands indicate that the editing process is to commence, then processing proceeds with step S257; otherwise, processing returns to step S253.

In step S257, the value of order data NO is stored in RAM 456 as a maximum order data NOmax value. Processing proceeds with step S258 in which the value of order data NO, stored in RAM 456, is replaced with the value "2". Processing proceeds with step S259.

In step S259, CPU 432 retrieves from the editing table in RAM 456 a first cue-out time code data TCout1 of the segment having an FLG value one less than the value of order data NO. CPU 432 also retrieves from ROM 430 margin data D2. TCout1 and margin data D2 are supplied to calculating device 448. Calculating device 448 subtracts margin data D2 from TCout1 to produce a difference value which is supplied to RAM 456. Processing proceeds according to step S260 in which the difference value is stored in the editing table in RAM 456 as the playback starting point time code data TCf of the segment having an FLG value equal to the value of order data NO. Processing proceeds with step S261.

In step S261, the value of order data NO stored in RAM 456 is incremented by one. Processing proceeds with step S262.

In step S262, CPU 432 retrieves from RAM 456 the value of order data NO and the value of order data NOmax. CPU 432 determines whether the value of order data NO is greater than the value of order data NOmax. If the value of order data NO is greater than the value of order data NOmax, then processing proceeds according to step S263; otherwise, processing proceeds according to step S259.

In step S263, CPU 432 replaces the value of order data NO stored in RAM 456 with a value "1". Processing proceeds with step S264.

In step S264, CPU 432 retrieves from RAM 456 the value of order data NO. CPU 432 also retrieves from the editing table in RAM 456 all information associated with the segment having an FLG value equal to the value of order data NO and stores such information in RAM 456. Processing proceeds with step S265.

In step S265, the device identification code data, the cue-in address data, and the length data corresponding to the segment having an FLG value equal to the value of order data NO are retrieved by CPU 432. Disk controller 440 generates logical sector address data and length data from the retrieved cue-in address for supply to the device corresponding to the retrieved device identification code, e.g. disk drive 404. (To facilitate explanation it will be assumed in the following that disk drive 404 actually corresponds to the retrieved device identification code.) Disk drive 404 is controlled, in accordance with the retrieved length data, to reproduce the corresponding segment of video signals from a recording medium and to supply the reproduced video signals to memory 406. Processing proceeds with step S266.

In step S266, memory 406 stores the reproduced video signals and supplies the stored video signals, as needed, to decoder 408. Decoder 408 decodes the reproduced video signals in accordance with GOP header data and type-of-picture data included in the reproduced video signals. Decoded image data and audio data from the decoded video signals are supplied to special effects switcher 410. Decoded time code data TC is supplied to controller 427 and stored in RAM 456. Processing proceeds according to step S267. Special effects controller 452 controls special effects switcher 410 to route the decoded image data and audio data to disk drive 424. Processing proceeds with step S268.

In step S268, time code data TC is retrieved from RAM 456 by CPU 432. The time code data TC is updated by decoder 408 as the decoding process progresses. Processing proceeds with step S269.

In step S269, CPU 432 retrieves first cue-in time code data TCin1 from RAM 456. CPU 432 determines whether time code data TC and the retrieved time code data TCin1 are equal. If TC equals TCin1, then processing proceeds with step S270; otherwise, processing returns to step S268.

In step S270, disk controller 440 controls disk drive 424 to commence storing decoded image data and audio data supplied by decoder 408 through special effects switcher 410. In the following step S271, time code generator 454 generates time code data for supply to disk drive 424. Disk controller 440 generates logical sector address data and length data also for supply to disk drive 424. Disk drive 424 stores the decoded image data and audio data in association with the corresponding time code data. Processing continues with step S272.

In step S272, time code data TC is retrieved from RAM 456 by CPU 432. The time code data TC is updated by decoder 408 as the decoding process progresses. Processing proceeds with step S273.

In step S273, CPU 432 retrieves from RAM 456 a start point time code TCf. CPU 432 determines whether time code data TC equals the retrieved time code data TCf. If time code data TC equals time code data TCf, then processing proceeds with step S274; otherwise, processing returns to step S271.

In step S274, the value of order data NO stored in RAM 456 is incremented by one. Processing proceeds with step S275.

In step S275, CPU 432 retrieves from RAM 456 the value of order data NO and the value of order data NOmax. CPU 432 determines whether the value of order data NO is greater than the value of order data NOmax. If the value of order data NO is greater than the value of order data NOmax, then processing proceeds according to step S250 is complete; otherwise, processing returns to step S264. When it is determined that the value of order data NO exceeds the value of order data NOmax, each of the segments recorded in the editing table have been recorded on disk drive 424.

As is apparent from the above description, an alternate embodiment of editing system 400 may omit VTR 402. Such a system utilizes segments of video signals stored in disk drives 404 and 418.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A method of editing a plurality of coded communication signals stored on a recording medium, said method comprising the steps of:

designating for a decoding process and for an editing process a plurality of designated signals from among said plurality of coded communication signals, wherein said decoding process requires an additional information not included in said plurality of designated signals;

designating from among said plurality of coded communication signals a plurality of additional signals that includes said additional information, wherein said plurality of additional signals is not edited during said editing process;

reproducing from said recording medium said plurality of designated signals and said plurality of additional signals;

decoding said plurality of additional signals to produce a plurality of decoded additional signals;

decoding said plurality of designated signals according to said decoding process with a reference to said plurality of decoded additional signals to produce a plurality of decoded signals; and editing said plurality of decoded signals according to said editing process.

2. The method according to claim 1, wherein said plurality of coded communication signals comprises a plurality of coded video signals.

3. The method according to claim 1, wherein said plurality of coded video signals comprises a plurality of predictively encoded video signals and wherein said decoding process comprises a predictive decoding process.

4. The method according to claim 1, wherein said plurality of coded video signals comprises a plurality of bidirectionally predictively encoded video signals and wherein said decoding process comprises a bidirectional predictive decoding process.

5. The method according to claim 4, wherein said plurality of additional signals includes a plurality of intracoded signals.

6. The method according to claim 1, wherein the step of designating a plurality of designated signals comprises the steps of:

receiving from a user a cue-in point indicating a first position among said plurality of coded communication signals;

receiving from a user a cue-out point indicating a second position among said plurality of coded communication signals; and designating as said plurality of designated signals the coded communication signals located between said first position and said second position.

7. The method according to claim 6, further comprising the steps of:

decoding said plurality of coded communication signals to produce a plurality of decoded communication signals; and displaying to said user said plurality of decoded communication signals.

8. The method according to claim 6, further comprising the steps of:

determining a margin cue-in point indicating a third position among said plurality of coded communication signals, wherein said third position is located before said first position; and determining a margin cue-out point indicating a fourth position among said plurality of coded communication signals, wherein said fourth position is located after said second position.

9. The method according to claim 8, further comprising the step of designating as said plurality of additional signals the coded communication signals located between said third position and said first position.

10. The method according to claim 8, further comprising the step of designating as said plurality of additional signals the coded communication signals located between said second position and said fourth position.

11. The method according to claim 1, wherein the step of designating said plurality of additional signals comprises the steps of:

determining a margin of coded communication signals located adjacent said plurality of designated signals; and designating said margin of coded communication signals as said plurality of additional signals.

12. The method according to claim 1, wherein said editing process comprises an A/B roll editing process.

13. The method according to claim 1, wherein said editing process comprises a cut editing process.

14. An apparatus for editing a plurality of coded communication signals stored on a recording medium, said apparatus comprising:

first designating means for designating for a decoding process and for an editing process a plurality of designated signals from among said plurality of coded communication signals, wherein said decoding process requires an additional information not included in said plurality of designated signals;

second designating means for designating from among said plurality of coded communication signals a plurality of additional signals that includes said additional information, wherein said plurality of additional signals is not edited during said editing process;

means for reproducing from said recording medium said plurality of designated signals and said plurality of additional signals;

first decoding means for decoding said plurality of additional signals to produce a plurality of decoded additional signals;

second decoding means for decoding said plurality of designated signals according to said decoding process with a reference to said plurality of decoded additional signals to produce a plurality of decoded signals; and editing means for editing said plurality of decoded signals according to said editing process.

15. The apparatus according to claim 14, wherein said plurality of coded communication signals comprises a plurality of coded video signals.

16. The apparatus according to claim 14, wherein said plurality of coded video signals comprises a plurality of predictively encoded video signals and wherein said decoding process comprises a predictive decoding process.

17. The apparatus according to claim 14, wherein said plurality of coded video signals comprises a plurality of bidirectionally predictively encoded video signals and wherein said decoding process comprises a bidirectional predictive decoding process.

18. The apparatus according to claim 17, wherein said plurality of additional signals includes a plurality of intra-coded signals.

19. The apparatus according to claim 14, wherein said first designating means comprises:

means for receiving from a user a cue-in point indicating a first position among said plurality of coded communication signals;

means for receiving from a user a cue-out point indicating a second position among said plurality of coded communication signals; and means for designating as said plurality of designated signals the coded communication signals located between said first position and said second position.

20. The apparatus according to claim 19, further comprising:

means for decoding said plurality of coded communication signals to produce a plurality of decoded communication signals; and means for displaying to said user said plurality of decoded communication signals.

21. The apparatus according to claim 19, further comprising:

means for determining a margin cue-in point indicating a third position among said plurality of coded communication signals, wherein said third position is located before said first position; and means for determining a margin cue-out point indicating a fourth position among said plurality of coded communication signals, wherein said fourth position is located after said second position.

22. The apparatus according to claim 21, further comprising means for designating as said plurality of additional signals the coded communication signals located between said third position and said first position.

23. The apparatus according to claim 21, further comprising means for designating as said plurality of additional signals the coded communication signals located between said second position and said fourth position.

24. The apparatus according to claim 14, wherein the second designating means comprises:

means for determining a margin of coded communication signals located adjacent said plurality of designated signals; and means for designating said margin of coded communication signals as said plurality of additional signals.

25. The apparatus according to claim 14, wherein said editing means comprises an A/B roll editing device.

26. The apparatus according to claim 14, wherein said editing means comprises a cut editing device.

* * * * *